(12) United States Patent
Shirota

(10) Patent No.: US 7,684,122 B2
(45) Date of Patent: Mar. 23, 2010

(54) ZOOM LENS AND IMAGING SYSTEM USING THE SAME

(75) Inventor: Eiji Shirota, Shibuya-ku (JP)

(73) Assignee: Olympus Imaging Corp., Tokyo (JP)

( * ) Notice: Subject to any disclaimer, the term of this patent is extended or adjusted under 35 U.S.C. 154(b) by 115 days.

(21) Appl. No.: 11/901,171

(22) Filed: Sep. 13, 2007

(65) Prior Publication Data

US 2009/0002840 A1  Jan. 1, 2009

(30) Foreign Application Priority Data

Sep. 26, 2006 (JP) ............................. 2006-260178

(51) Int. Cl.
*G02B 15/14* (2006.01)
*G02B 17/00* (2006.01)
(52) U.S. Cl. .................. 359/676; 359/678; 359/726
(58) Field of Classification Search ................ 359/676, 359/678, 683, 726–736; 348/240.99–240.3, 348/335–369; 396/72–88
See application file for complete search history.

(56) References Cited

U.S. PATENT DOCUMENTS

2007/0070513 A1* 3/2007 Yamashita et al. .......... 359/676

FOREIGN PATENT DOCUMENTS

JP 2004-354869 12/2004
JP 2004-354871 12/2004

* cited by examiner

*Primary Examiner*—Darryl J Collins
(74) *Attorney, Agent, or Firm*—Kenyon & Kenyon LLP

(57) ABSTRACT

The invention relates to a zoom lens that enables an optical path to be easily bent by a reflecting optical element, has a wide-angle design and high optical performance as represented by a high zoom ratio of about 3.4, is extremely slimmed down in the depth direction, and costs less. The zoom lens comprises a positive first lens group G1, a negative second lens group G2, a positive third lens group G3, a positive fourth lens group G4 and a negative fifth lens group G5. Upon zooming from the wide-angle end to the telephoto end, the first lens group G1 remains substantially fixed with respect to an image plane I, and at least the second G2 and the fourth lens group G4 move. The first lens group G1 includes a reflecting optical element for bending the optical path involved, and a portion of the first lens group G1 on an object side with respect to the reflecting surface has negative refracting power. The zoom lens satisfies condition (1) with respect to the focal length of the fifth lens group G5.

18 Claims, 13 Drawing Sheets

ZOOM LENS AND IMAGING SYSTEM USING THE SAME

This application claims benefits of Japanese Application No. 2006-260178 filed in Japan on Sep. 26, 2006, the contents of which are incorporated herein by this reference.

BACKGROUND OF THE INVENTION

The present invention relates generally to a zoom lens and an imaging system using the same, and more particularly to a zoom lens with the optical axis of its optical system bent and an imaging system incorporating the same.

In recent years, digital cameras (electronic cameras) have received attention as the coming generation of cameras, an alternative to silver-halide 35 mm-film (135-format) cameras. Currently available digital cameras are broken down into some. categories in a wide range from the high-end type for commercial use to the portable low-end type.

In view of the category of the portable low-end type in particular, the primary object of the present invention is to provide the technology for implementing easy-to-use, high-zoom-ratio, less costly video or digital cameras whose depth dimension is reduced while high image quality is ensured, and which have zoom ratios high enough to cover a wide focal length range from the wide-angle end to the telephoto end.

The gravest bottleneck in diminishing the depth dimension of cameras is the thickness of an optical system, especially a zoom lens system from the surface located nearest to its object side to an imaging plane. The technology currently in vogue for slimming down camera bodies makes use of a so-called collapsible lens mount that allows the optical system to be taken out of the camera body for shooting and received therein for carrying around.

However, the use of the collapsible lens mount is not preferable in view of ease of operation, because some time is taken for sending the zoom lens received at it ready for use. Making the lens group nearest to the object side movable is again not preferable for prevention of entrance of moisture and dust. More recent years have seen a camera version that takes no waiting time for sending it ready for use (for booting a zoom lens up); it works favorably for prevention of entrance of moisture and dust and is much more slimmed down in its depth direction by use of an optical system with an optical path (optical axis) bent by a reflecting optical member such as a mirror or a prism. In a typical camera of this version, the lens group nearest to the object side of the zoom lens is fixed in terms of position and the reflecting optical member is received in that lens group, so that the subsequent optical path is bent longitudinally or transversely with respect to a camera body, thereby reducing the depth-direction dimension as much as possible.

For the time being, most video or digital cameras under the portable category to which the invention is directed would have a half angle of view of about 30° at the wide-angle end; however, wide-angle cameras having a greater taking range will come out anyway.

For instance, Patent Publication 1 comes up with a typical wide-angle zoom lens relying upon a bent optical system. However, that zoom lens has a half angle of view of as large as about 37°, yet the zoom ratio remains at barely about 2.8. On the other hand, the zoom lens of Patent Publication 2 has a half angle of view of about 37° and a zoom ratio of about 3.7, yet its full length is still long.

Patent Publication 1 JP(A)2004-354871
Patent Publication 2 JP(A)2004-354869

SUMMARY OF THE INVENTION

In consideration of such problems with the prior art as briefed above, the primary object of the invention is to provide a zoom lens that can instantaneously send a camera ready for use (with no waiting time for boosting the zoom lens up) as is not the case with a collapsible lens mount camera, and is preferable for prevention of entrance of moisture and dust. According to the invention, the optical path (optical axis) of the optical system can be easily bent by means of a reflecting optical member such as a prism so that a camera, when the zoom lens of the invention is applied to it, can be much more reduced in terms of depth-direction thickness. Further, that zoom lens is of a wide-angle arrangement that has high optical performance as represented by a zoom ratio of as high as about 3.4, is very thin in the depth direction, and costs less.

According to the invention, the aforesaid object is accomplished by the provision of a zoom lens comprising, in order from its object side, a first lens group having positive power, a second lens group having negative power, a third lens group having positive power, a fourth lens group having positive power and a fifth lens group having negative power, characterized in that:

upon zooming from the wide-angle end to the telephoto end of the zoom lens, said first lens group remains fixed with respect to an image plane, and at least said second lens group and said fourth lens group moves, said first lens group includes a reflecting optical element for bending an optical path and has negative refracting power on an object side with respect to a reflecting surface, and said zoom lens satisfies the following condition (1):

$$1.5 < |f_5/f_w| < 2.7 \ldots \tag{1}$$

where $f_5$ is the focal length of the fifth lens group, and $f_w$ is the focal length of the whole zoom lens system at the wide-angle end.

The advantages of, and the requirements for, the aforesaid arrangement according to the invention are now explained.

By allowing the zoom lens of the invention to have such arrangement as mentioned above, the optical path involved can be bent at the first lens group thereby slimming down the zoom lens in the depth direction, and by allowing the second and the fourth lens group to be movable, they can share the load of zooming so that the zoom lens can have a high zoom ratio. By allowing the fifth lens group to have negative power and enlarge light beams, the focal lengths of the first and the fourth lens group can be so curtailed that compactness is achievable. As the angle of view grows wide, it causes lens diameter to grow large, and distortion to become large. By locating negative refracting power on an object side with respect to a reflecting surface in the first lens group, however, the lens diameter can be diminished, and by locating negative power in the fifth lens group, distortion produced at the first lens group can be canceled out. Further, allowing the first lens group to remain fixed with respect to the image plane takes no time for sending the associated camera ready for use, and is preferable for prevention of moisture and dust as well.

Condition (1) provides a proper definition of the power of the first lens group; as the upper limit of 2.7 is exceeded, it will cause the power of the fifth lens group to become weak, rendering compactness difficult, and as the lower limit of 1.5 is not reached, it will render correction of field curvature difficult.

For the zoom lens arrangement of the invention, it is preferable to fix the third lens group during zooming. By allowing the third lens group to remain fixed during zooming, it is possible to locate an aperture stop near that to diminish lens diameter.

Preferably, the fifth lens group at least comprises a cemented lens and a positive lens. If the power of the fifth lens group is strong enough to achieve compactness, there is then a worsening of the Petzval's sum; however, if the cemented lens and the positive lens are properly located, it is then possible to keep the image plane in a good condition.

Preferably, the first lens group comprises, in order from its object side, a negative lens and a prism that is a reflecting optical element. If the negative lens is located nearest to the object side and the optical path is bent after that, it is then possible to make the associated camera thin. Further, the location of the negative lens in the first lens group enables the effective diameter to be smaller. Furthermore, the use of the prism as the reflecting optical element keeps the length of the optical path so short that the spacing between the first lens and the aperture stop can be curtailed. It is in turn possible to keep the entrance pupil shallow and achieve compactness.

Preferably, the zoom lens of the invention satisfies the following condition (2).

$$0.8 < |f_2/f_w| < 1.5 \quad (2)$$

Here $f_2$ is the focal length of the second lens group.

Condition (2) provides a proper definition of the power of the second lens group. As the lower limit of 0.8 to that is not reached or the power of the second lens group grows strong, it may work for curtailing the whole length of the zoom lens because the amount of movement of the second lens group remains small; however, there will be some considerable astigmatism and distortion occurring, which render it difficult to correct the whole zoom lens system for aberrations. As the upper limit of 1.5 is exceeded, that will render it difficult to keep the whole length short.

Preferably, the zoom lens of the invention satisfies the following condition (3).

$$2.0 < f_1/f_w < 5.0 \quad (3)$$

Here $f_1$ is the focal length of the first lens group.

Condition (3) provides a proper definition of the power of the first lens group. At greater than the upper limit of 0.5, the entrance pupil will grow deep, resulting in an increased lens diameter. At less than the lower limit of 2.0, correction of off-axis aberrations and chromatic aberrations will become difficult.

Preferably, the zoom lens of the invention satisfies the following condition (4).

$$1.0 < |f_{1L1}/f_w| < 3.0 \quad (4)$$

Here $f_{1L1}$ is the focal length of a system of the first lens group on an object side with respect to the reflecting surface therein.

Condition (4) provides a proper definition of the power of the negative lens in the first lens group. To make the entrance pupil shallow thereby enabling the optical path to be physically bent, it is preferable to make the power of the negative lens in the first lens group strong. At greater than the upper limit of 3.0, the entrance pupil will remain deep, and an effort to make sure some angle of view will result in an increase in the diameter and size of the respective optical elements that form the first lens group, which will render it physically unfeasible to bend the optical path. At less than the lower limit of 1.0, the magnification that can be taken by the lens groups that follow the first lens group and move for zooming will be close to zero, offering such problems as an increase in the amount of their movement and a decreased zoom ratio. At the same time, it will be difficult to correct off-axis aberrations such as distortion and chromatic aberrations.

For the first lens group, it is also preferable that the negative lens comprises an aspheric surface. The negative lens in the first lens group receives rim rays of some height upon zooming at the wide-angle end, producing very large off-axis aberrations. As the power of the negative lens grows strong to keep the entrance pupil shallow, some considerable aberrations are going to be produced; it is desired to make use of the aspheric surface to correct those aberrations. Further, the curvature of that surface is so relaxed that there is less deterioration caused by production errors, and a lot more contribution to a reduction of the depth dimension of the associated camera as well.

It is noted that the invention also includes an imaging system using such a zoom lens as mentioned above. It is then preferable that a low-pass filter is interposed between the zoom lens and an imaging device.

As can be seen from the explanations given above, the present invention can successfully provide a zoom lens that can instantaneously send a camera ready for use (with no waiting time for boosting the zoom lens up) as is not the case with a collapsible lens mount camera, and is preferable for prevention of entrance of moisture and dust. With the arrangement of the invention, the optical path (optical axis) of the optical system can be easily bent by means of a reflecting optical member such as a prism so that a camera, when the zoom lens of the invention is applied to it, can be much more reduced in terms of depth-direction thickness. Further, that zoom lens is of a wide-angle arrangement that has high optical performance as represented by a zoom ratio of as high as about 3.4, is very thin in the depth direction, and costs less.

Still other objects and advantages of the invention will in part be obvious and will in part be apparent from the specification.

The invention accordingly comprises the features of construction, combinations of elements, and arrangement of parts that will be exemplified in the construction hereinafter set forth, and the scope of the invention will be indicated in the claims.

DESCRIPTION OF THE PREFERRED EMBODIMENTS

The zoom lens of the invention is now explained with reference to Examples 1, 2, 3, 4 and 5. FIGS. 1, 2, 3, 4 and 5 are illustrative in optically taken-apart form of Examples 1, 2, 3, 4 and 5 at the wide-angle ends, in intermediate states and at the telephoto ends, respectively, upon focusing on an infinite object point. Throughout FIGS. 1 to 5, G1 stands for the first lens group, G2 the second lens group, G3 the third lens group, S an aperture stop, G4 the fourth lens group, G5 the fifth lens group, F an optical low-pass filter, G a cover glass for a CCD that is an electronic imaging device, and I the image plane of CCD. It is noted that an optical path bending prism as the reflecting optical member located in the first lens group G1 is shown in the form of a plane-parallel plate P with taken-apart optical paths, and no reflecting surface is given. A near infrared sharp cut coating, for instance, could be applied directly onto the optical low-pass filter F, or there could be another infrared cut absorption filter separately located. Alternatively, the near infrared sharp cut coating could be applied onto the entrance surface of a transparent flat plate.

EXAMPLE 1

Figure 1A:
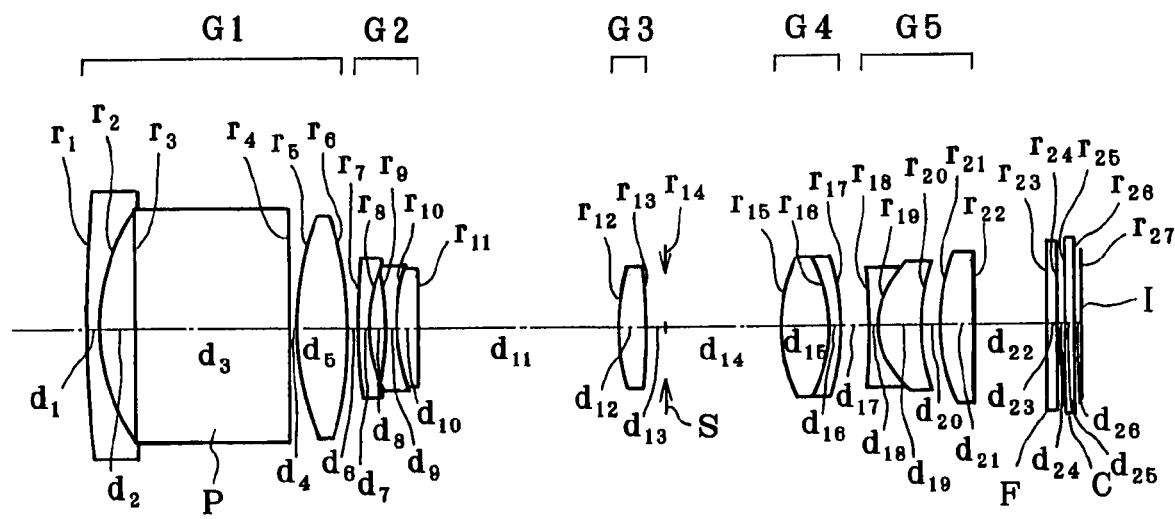
FIG. 1 is illustrative in optically taken-apart form of Example 1 of the inventive zoom lens at the wide-angle end (a), in an intermediate state (b) and at the telephoto end (c) upon focusing on an object point at infinity.
Figure 1B:
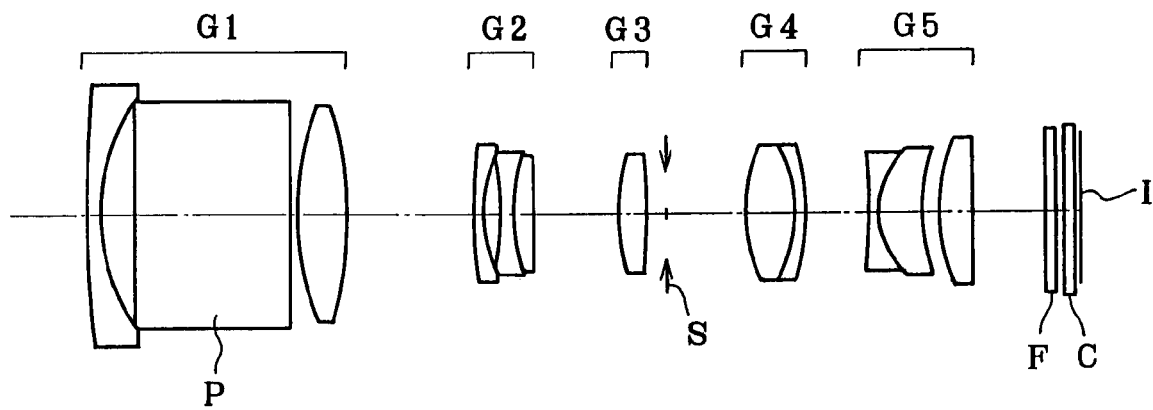
Figure 1C:
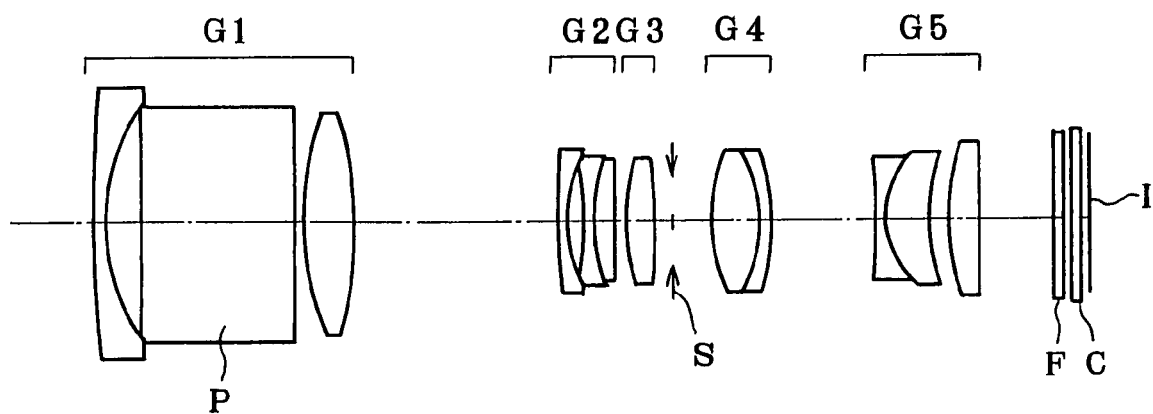

As shown in FIG. 1, this example is directed to a zoom lens made up of, in order from its object side, the first lens group G1 that has positive power and remains fixed during zooming, the second lens group G2 that has negative power and moves toward the image side from the wide-angle end to the telephoto end in such a way as to be positioned on the image side at the telephoto end rather than at the wide-angle end upon zooming, the third lens group G3 that has positive power and remains fixed during zooming, the aperture stop S that remains fixed during zooming, the fourth lens group G4 that has positive power and moves toward the object side from the wide-angle end to the telephoto end in such a way as to be positioned on the object side at the telephoto end rather than at the wide-angle end upon zooming, and the fifth lens group G5 that has negative power and remains fixed during zooming. A prism P located in the first lens group G1 works bending (flexing) an optical path.

In order from the object side of the zoom lens, the first lens group G1 is made up of a negative meniscus lens convex on its object side, the prism P and a double-convex positive lens; the second lens group G2 is made up of a negative meniscus lens convex on its object side and a cemented lens consisting of a double-concave negative lens and a double-convex positive lens; the third lens group G3 is made up of one double-convex positive lens; the fourth lens group G4 is made up of a cemented lens consisting of a double-convex positive lens and a negative meniscus lens concave on its object side; and the fifth lens group G5 is made of a cemented lens consisting of a double-concave negative lens and a positive meniscus lens convex on its object side and a double-convex positive lens.

Five aspheric surfaces are used: two at both surfaces of the double-convex positive lens in the first lens group G1, two at both surfaces of the double-convex positive lens in the third lens group G3, and one at the surface nearest to the object side of the cemented lens in the fourth lens group G4.

EXAMPLE 2

Figure 2A:
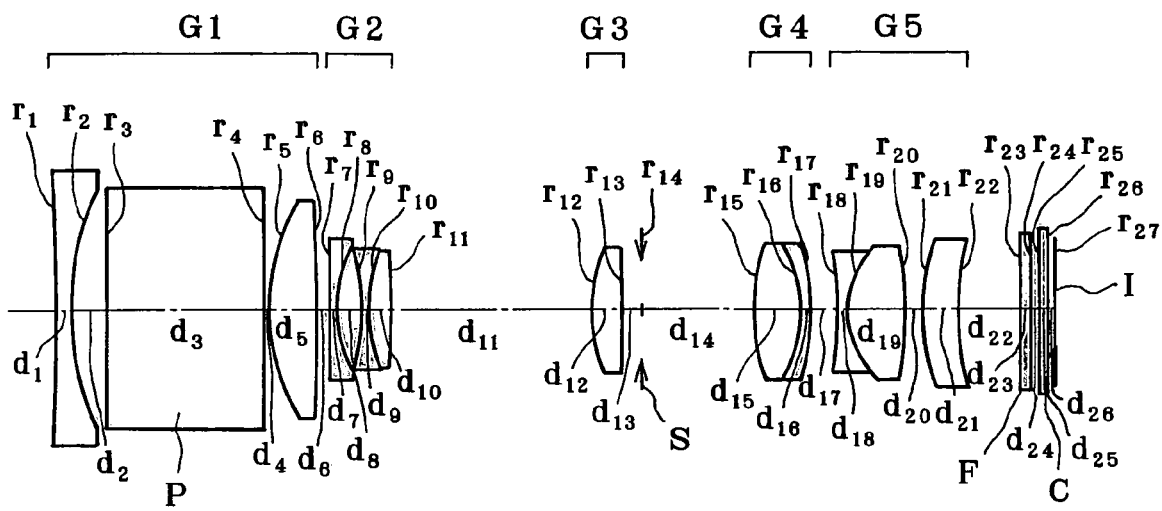
FIG. 2 is illustrative in optically taken-apart form, as in FIG. 1, of Example 2 of the inventive zoom lens.
Figure 2B:
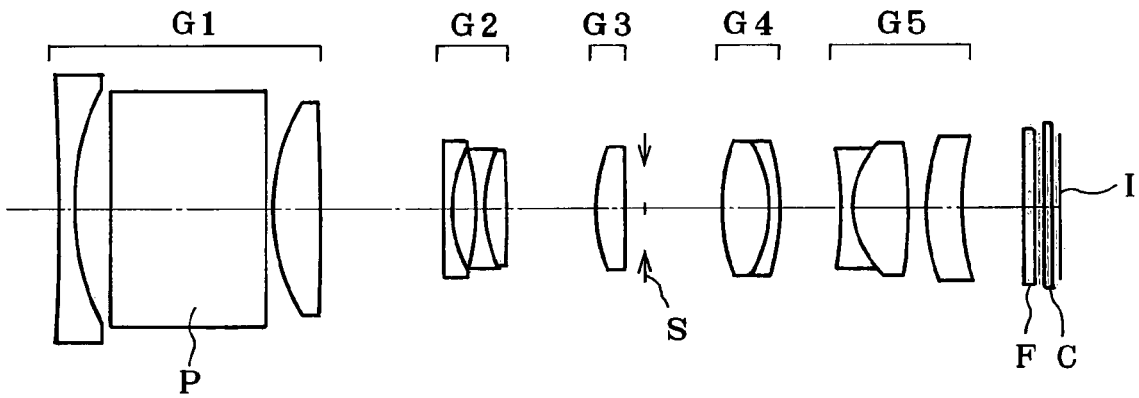
Figure 2C:
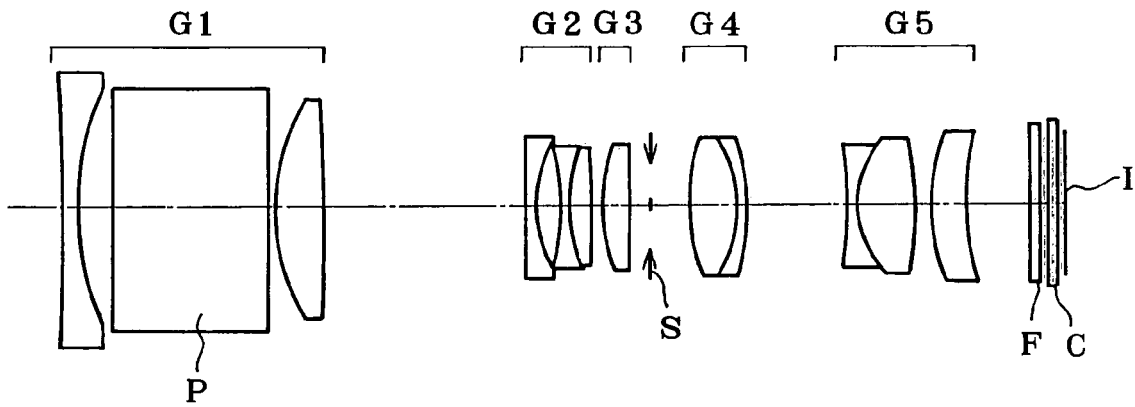

As shown in FIG. 2, this example is directed to a zoom lens made up of, in order from its object side, the first lens group G1 that has positive power and remains fixed during zooming, the second lens group G2 that has negative power and moves toward the image side from the wide-angle end to the telephoto end in such a way as to be positioned on the image side at the telephoto end rather than at the wide-angle end upon zooming, the third lens group G3 that has positive power and remains fixed during zooming, the aperture stop S that remains fixed during zooming, the fourth lens group G4 that has positive power and moves toward the object side from the wide-angle end to the telephoto end in such a way as to be positioned on the object side at the telephoto end rather than at the wide-angle end upon zooming, and the fifth lens group G5 that has negative power and remains fixed during zooming. A prism P located in the first lens group G1 works bending (flexing) an optical path.

In order from the object side of the zoom lens, the first lens group G1 is made up of a double-concave negative lens, the prism P and a double-convex positive lens; the second lens group G2 is made up of a negative meniscus lens convex on its object side and a cemented lens consisting of a double-concave negative lens and a double-convex positive lens; the third lens group G3 is made up of one double-convex positive lens; the fourth lens group G4 is made up of a cemented lens consisting of a double-convex positive lens and a negative meniscus lens concave on its object side; and the fifth lens group G5 is made of a cemented lens consisting of a double-concave negative lens and a double-convex positive lens and a positive meniscus lens convex on its object side.

Six aspheric surfaces are used: one at the image-side surface of the double-concave negative lens in the first lens group G1, two at both surfaces of the double-convex positive lens in the first lens group G1, two at both surfaces of the double-convex positive lens in the third lens group G3, and one at the surface nearest to the object side of the cemented lens in the fourth lens group G4.

EXAMPLE 3

Figure 3A:
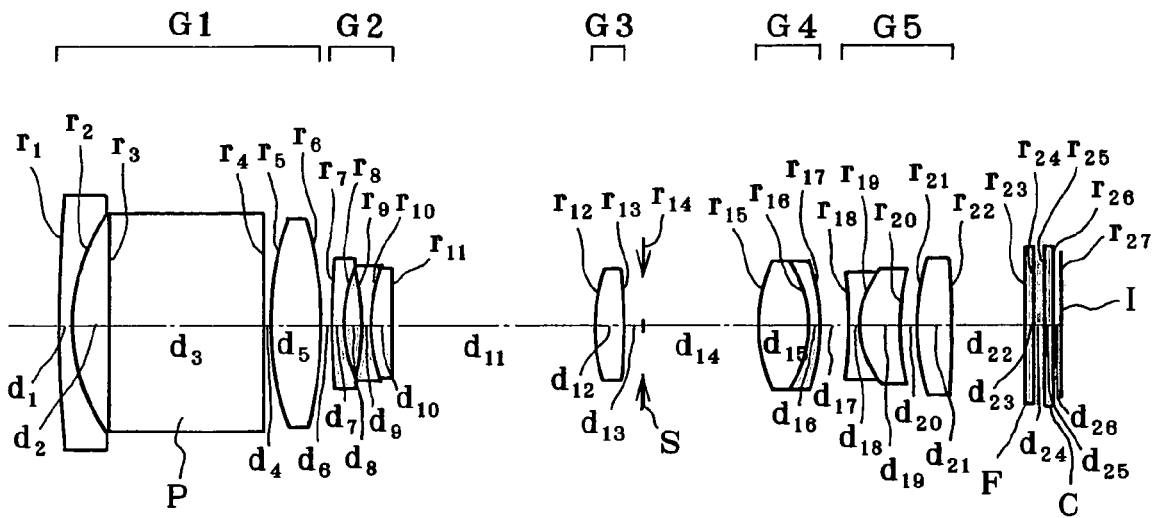
FIG. 3 is illustrative in optically taken-apart form, as in FIG. 1, of Example 3 of the inventive zoom lens.
Figure 3B:
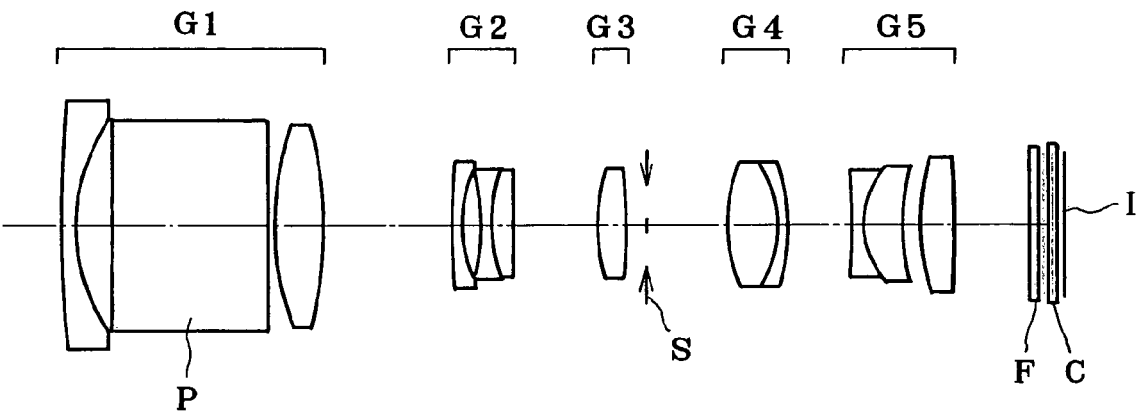
Figure 3C:
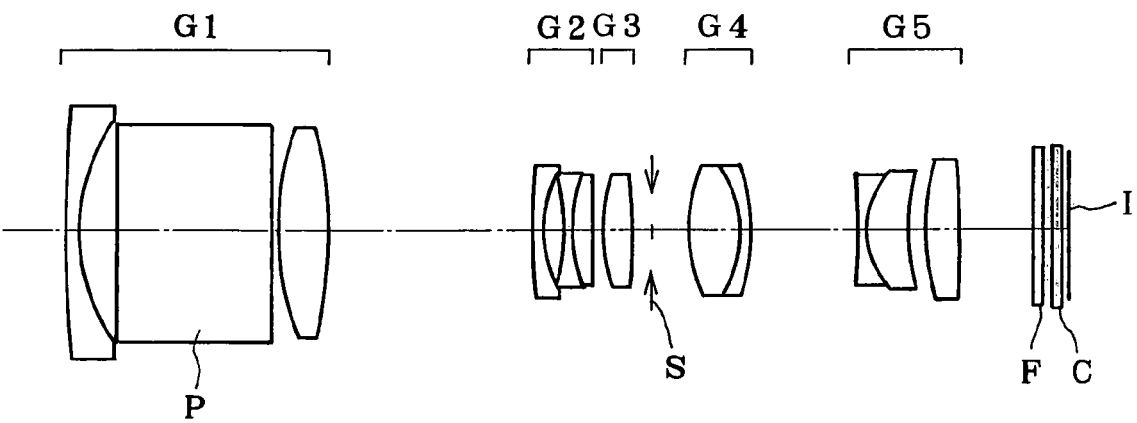

As shown in FIG. 3, this example is directed to a zoom lens made up of, in order from its object side, the first lens group G1 that has positive power and remains fixed during zooming, the second lens group G2 that has negative power and moves toward the image side from the wide-angle end to the telephoto end in such a way as to be positioned on the image side at the telephoto end rather than at the wide-angle end upon zooming, the third lens group G3 that has positive power and remains fixed during zooming, the aperture stop S that remains fixed during zooming, the fourth lens group G4 that has positive power and moves toward the object side from the wide-angle end to the telephoto end in such a way as to be positioned on the object side at the telephoto end rather than at the wide-angle end upon zooming, and the fifth lens group G5 that has negative power and remains fixed during zooming. A prism P located in the first lens group G1 works bending (flexing) an optical path.

In order from the object side of the zoom lens, the first lens group G1 is made up of a negative meniscus lens convex on its object side, the prism P and a double-convex positive lens; the second lens group G2 is made up of a negative meniscus lens convex on its object side and a cemented lens consisting of a double-concave negative lens and a positive meniscus lens convex on its object side; the third lens group G3 is made up of one double-convex positive lens; the fourth lens group G4 is made up of a cemented lens consisting of a double-convex positive lens and a negative meniscus lens concave on its object side; and the fifth lens group G5 is made of a cemented lens consisting of a double-concave negative lens and a positive meniscus lens convex on its object side and a double-convex positive lens.

Five aspheric surfaces are used: two at both surfaces of the double-convex positive lens in the first lens group G1, two at both surfaces of the double-convex positive lens in the third lens group G3, and one at the surface nearest to the object side of the cemented lens in the fourth lens group G4.

EXAMPLE 4

Figure 4A:
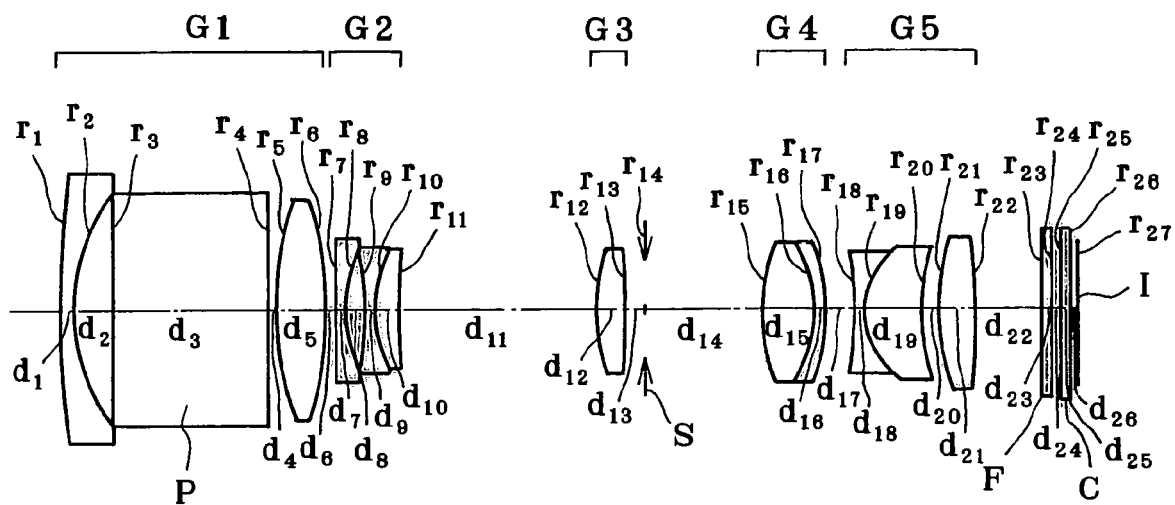
FIG. 4 is illustrative in optically taken-apart form, as in FIG. 1, of Example 4 of the inventive zoom lens.
Figure 4B:
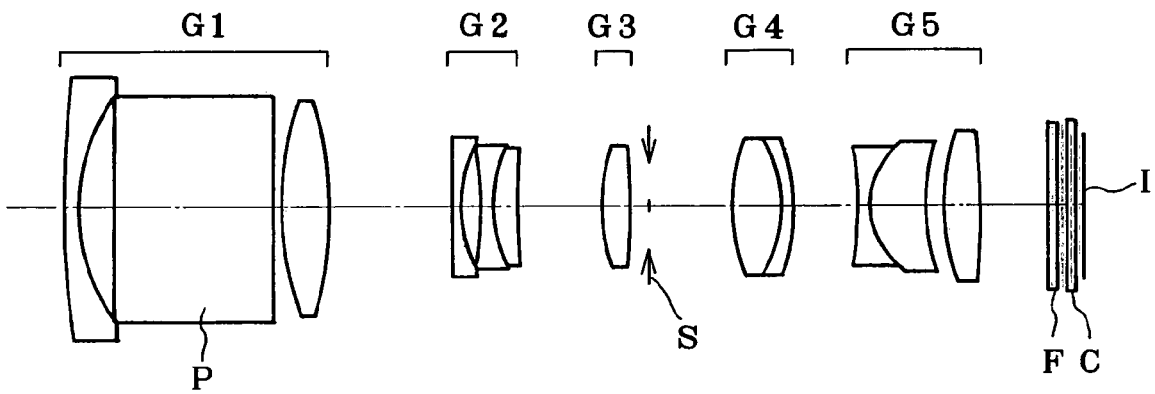
Figure 4C:
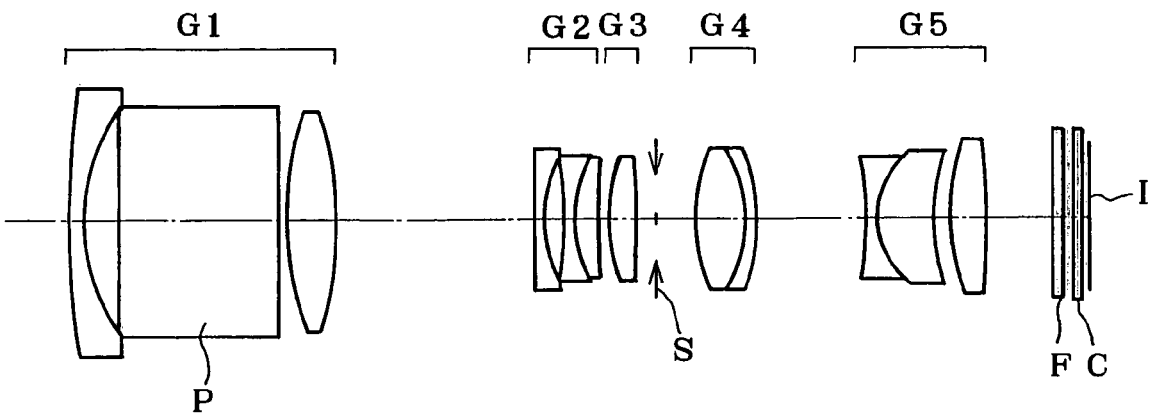

As shown in FIG. 4, this example is directed to a zoom lens made up of, in order from its object side, the first lens group G1 that has positive power and remains fixed during zooming, the second lens group G2 that has negative power and moves toward the image side from the wide-angle end to the telephoto end in such a way as to be positioned on the image side at the telephoto end rather than at the wide-angle end upon zooming, the third lens group G3 that has positive power and remains fixed during zooming, the aperture stop S that remains fixed during zooming, the fourth lens group G4 that has positive power and moves toward the object side from the wide-angle end to the telephoto end in such a way as to be positioned on the object side at the telephoto end rather than at the wide-angle end upon zooming, and the fifth lens group G5 that has negative power and remains fixed during zooming. A prism P located in the first lens group G1 works bending (flexing) an optical path.

In order from the object side of the zoom lens, the first lens group G1 is made up of a negative meniscus lens convex on its object side, the prism P and a double-convex positive lens; the second lens group G2 is made up of a negative meniscus lens convex on its object side and a cemented lens consisting of a double-concave negative lens and a positive meniscus lens convex on its object side; the third lens group G3 is made up of one double-convex positive lens; the fourth lens group G4 is made up of a cemented lens consisting of a double-convex positive lens and a negative meniscus lens concave on its object side; and the fifth lens group G5 is made of a cemented lens consisting of a double-concave negative lens and a positive meniscus lens convex on its object side and a double-convex positive lens.

Five aspheric surfaces are used: two at both surfaces of the double-convex positive lens in the first lens group G1, two at both surfaces of the double-convex positive lens in the third lens group G3, and one at the surface nearest to the object side of the cemented lens in the fourth lens group G4.

EXAMPLE 5

Figure 5A:
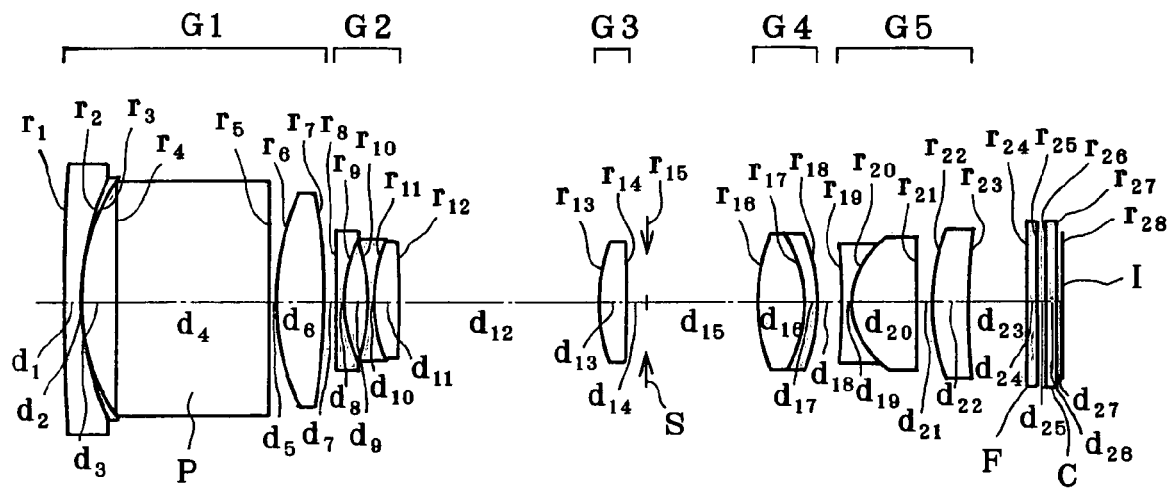
FIG. 5 is illustrative in optically taken-apart form, as in FIG. 1, of Example 5 of the inventive zoom lens.
Figure 5B:
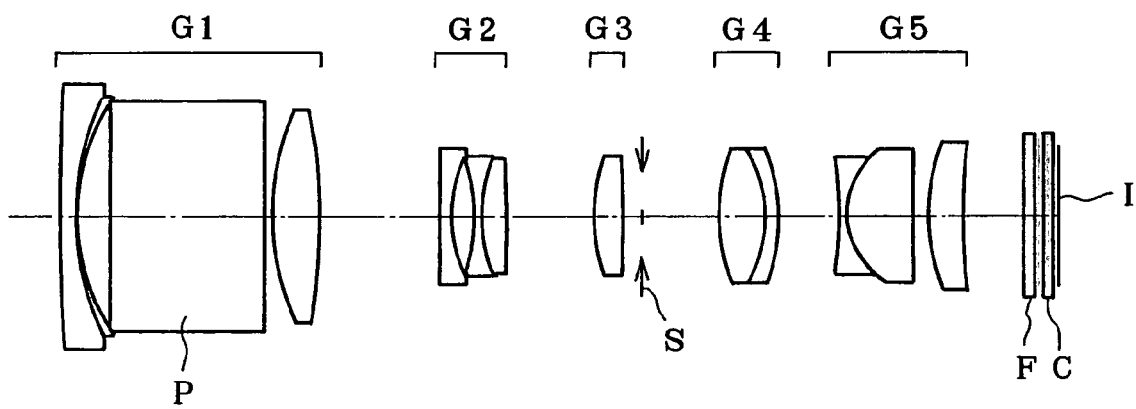
Figure 5C:
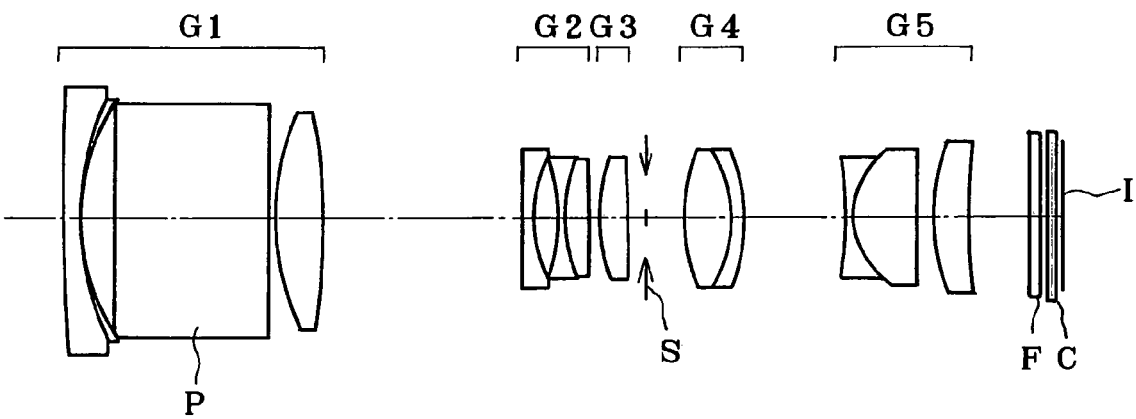
Figure 6A:
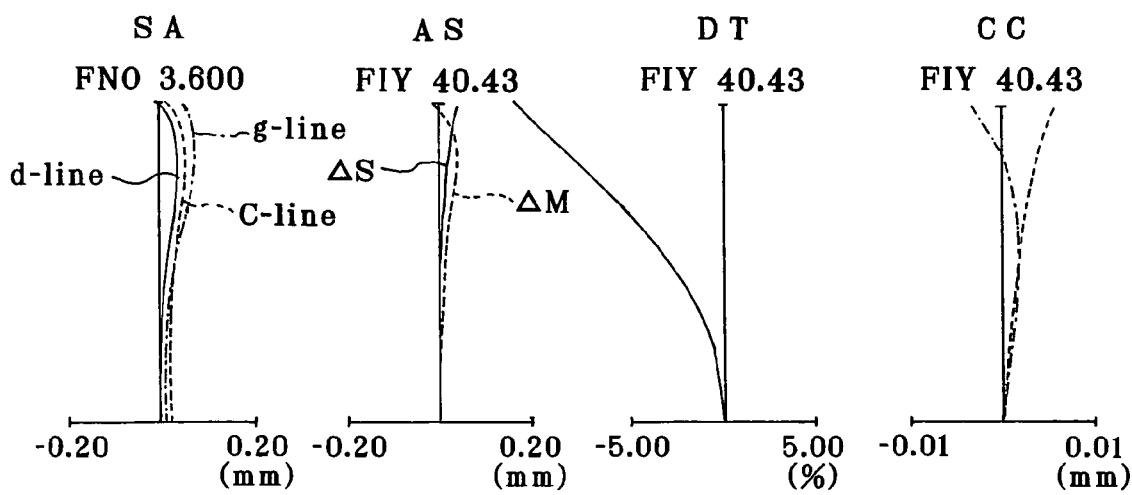
FIG. 6 is indicative of aberrations of Example 1 at the wide-angle end (a), in the intermediate state (b), and at the telephoto end (c) upon focusing on an object point at infinity.
Figure 6B:
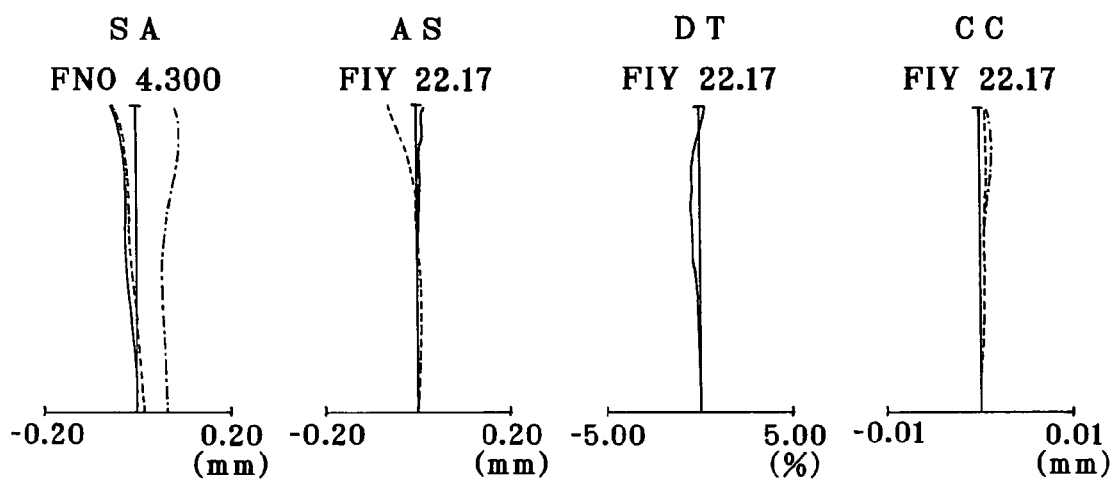
Figure 6C:
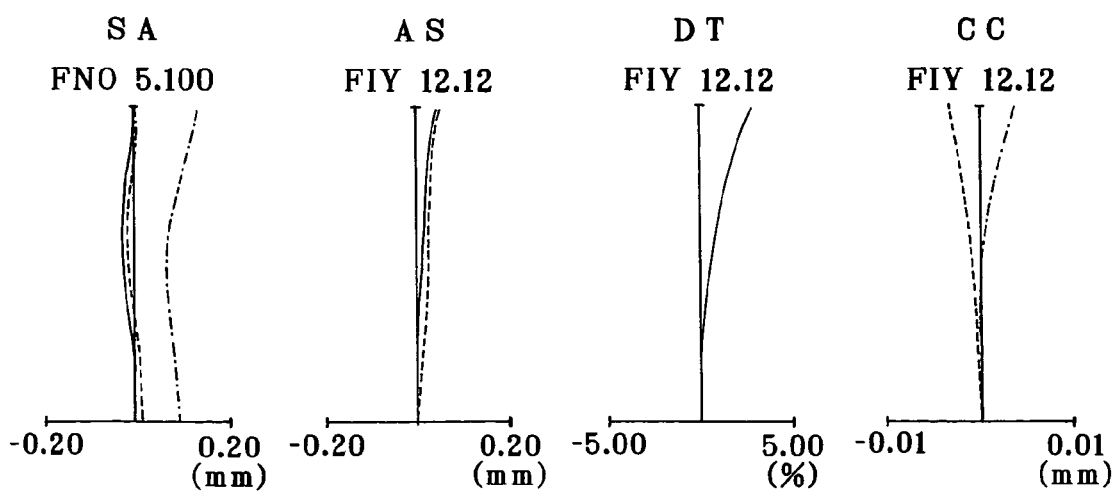
Figure 7A:
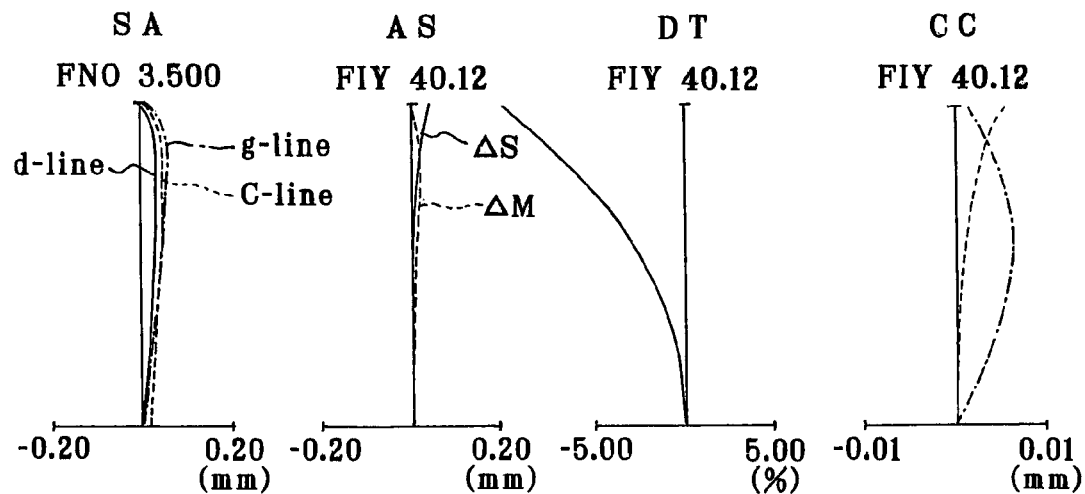
FIG. 7 is indicative, as in FIG. 6, of aberrations of Example 2.
Figure 7B:
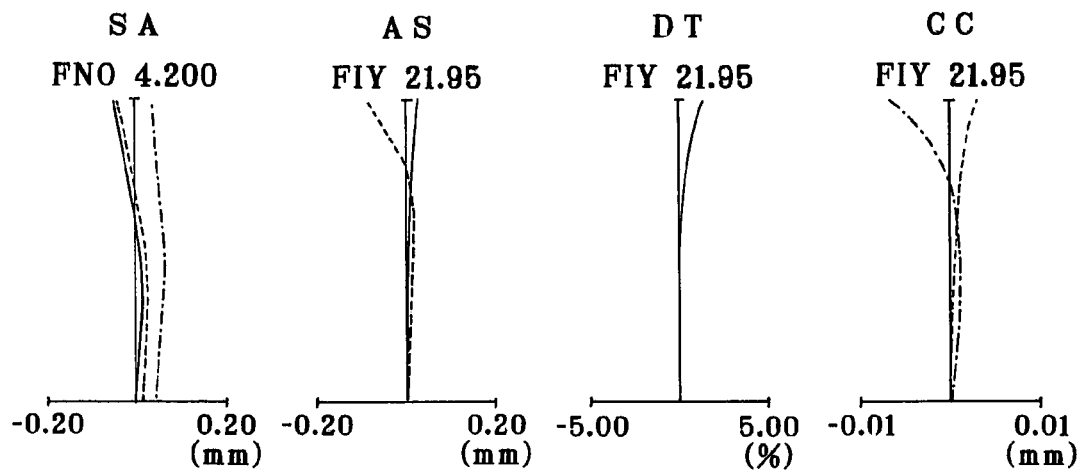
Figure 7C:
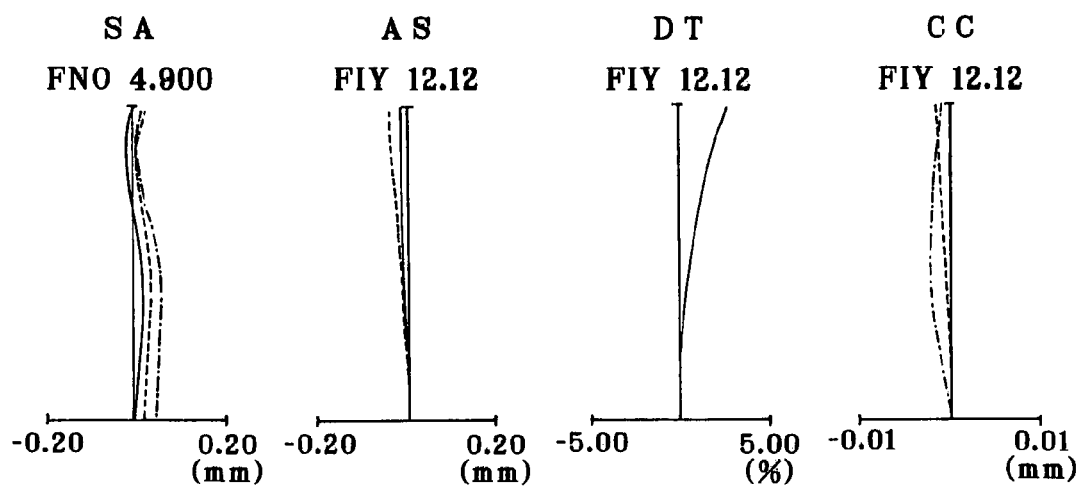
Figure 8A:
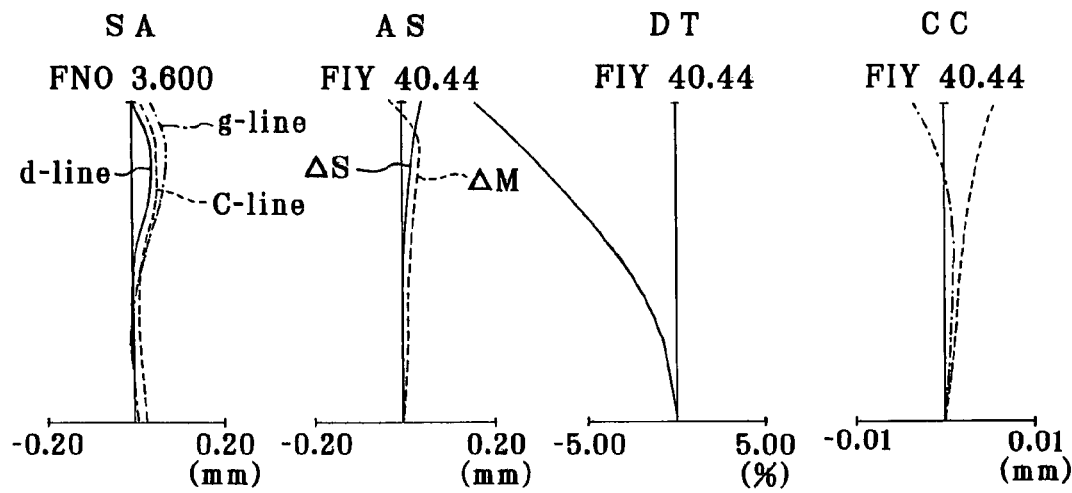
FIG. 8 is indicative, as in FIG. 6, of aberrations of Example 3.
Figure 8B:
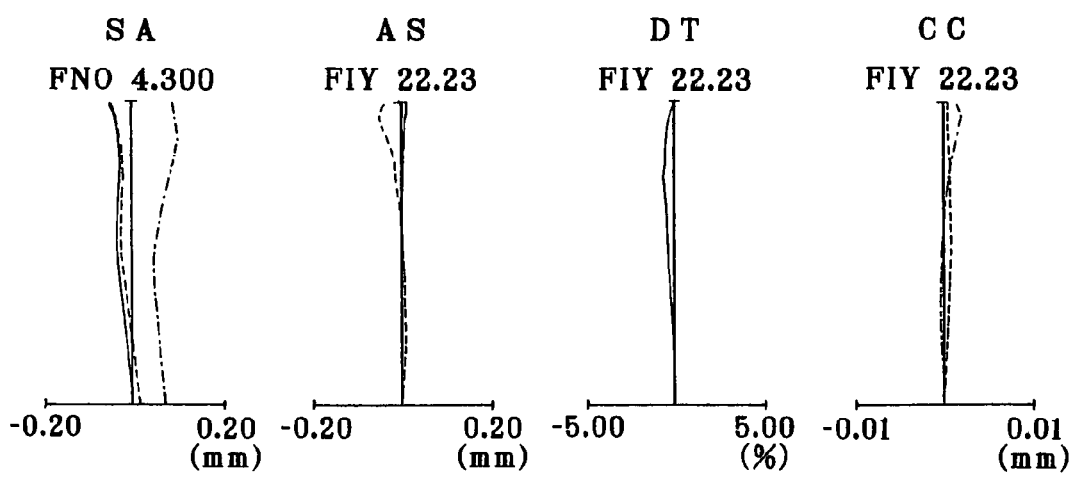
Figure 8C:
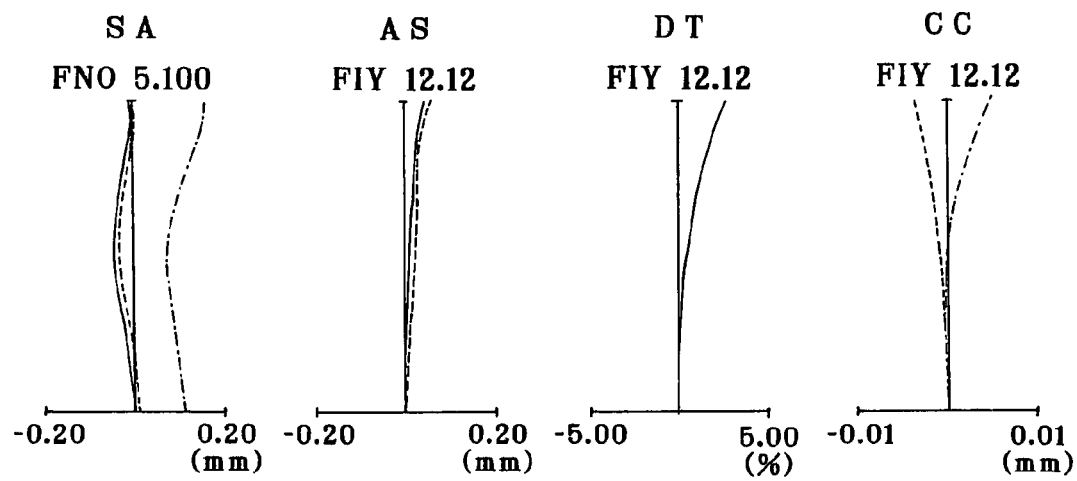
Figure 9A:
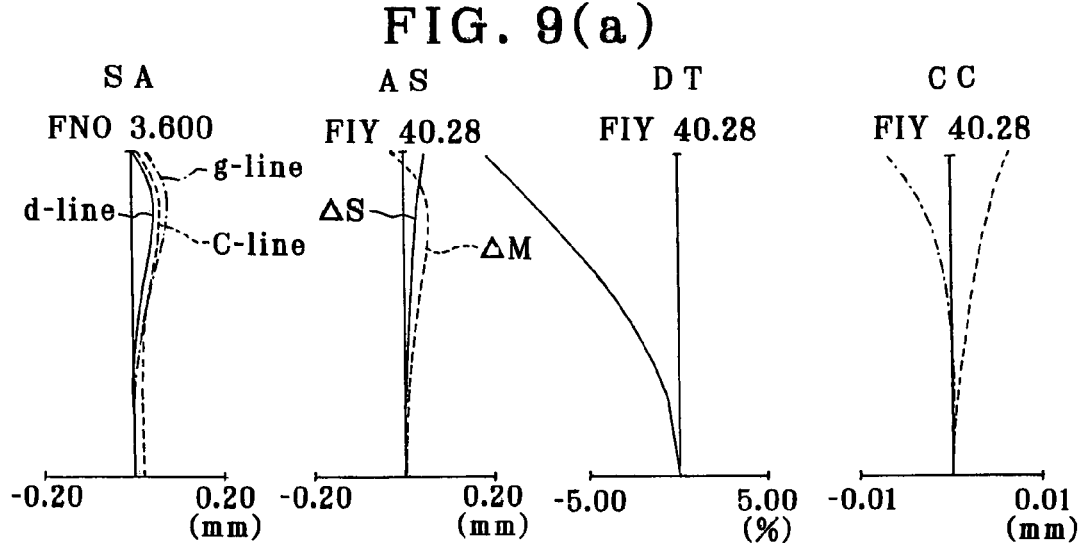
FIG. 9 is indicative, as in FIG. 6, of aberrations of Example 4.
Figure 9B:
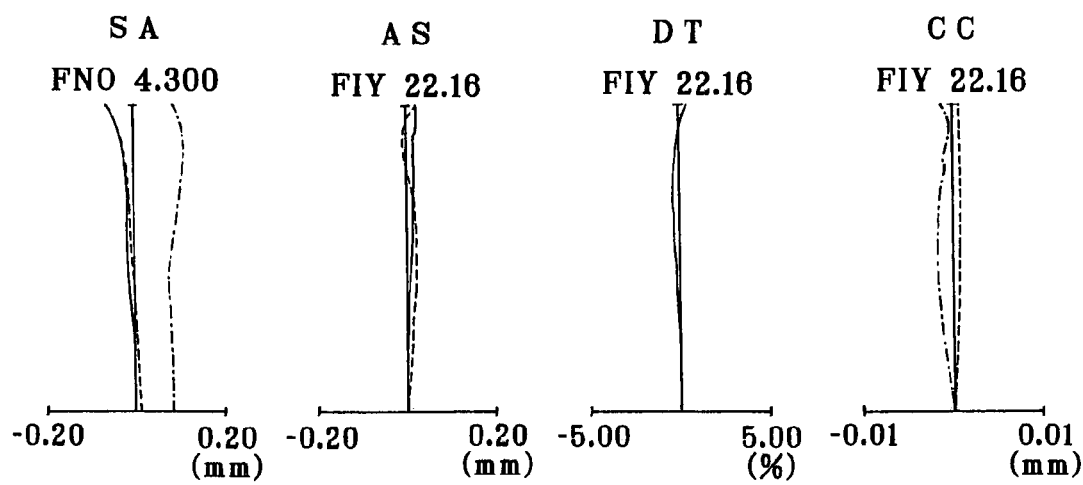
Figure 9C:
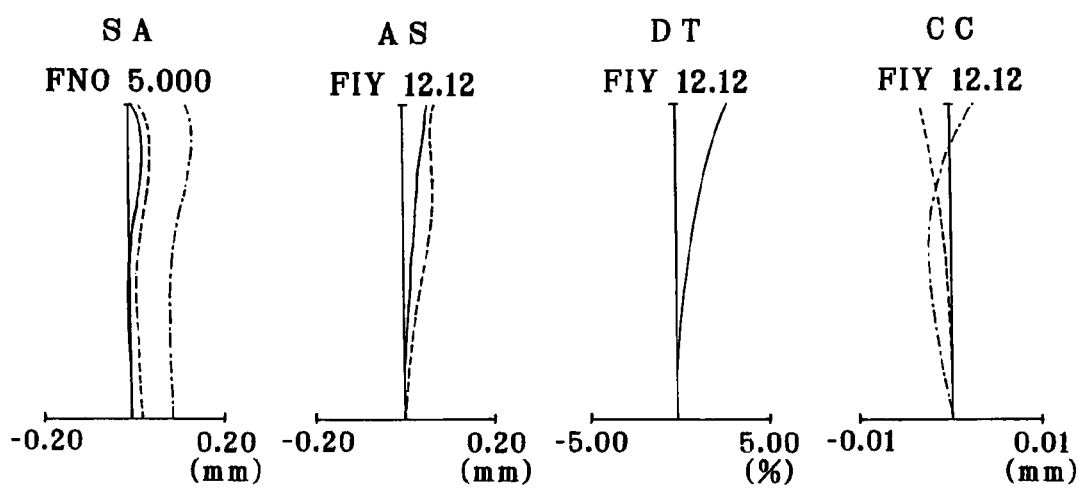
Figure 10A:
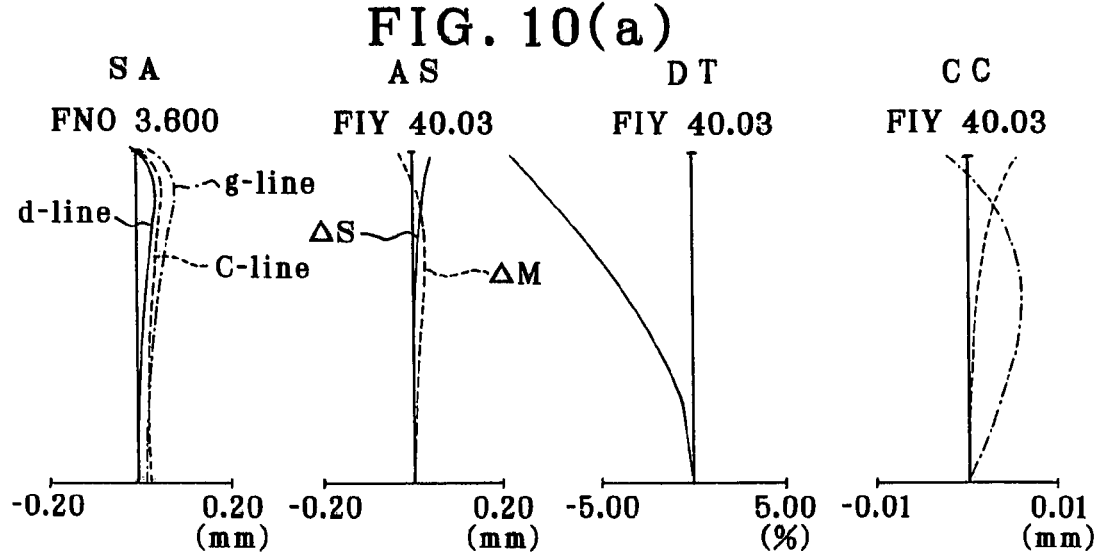
FIG. 10 is indicative, as in FIG. 6, of aberrations of Example 5.
Figure 10B:
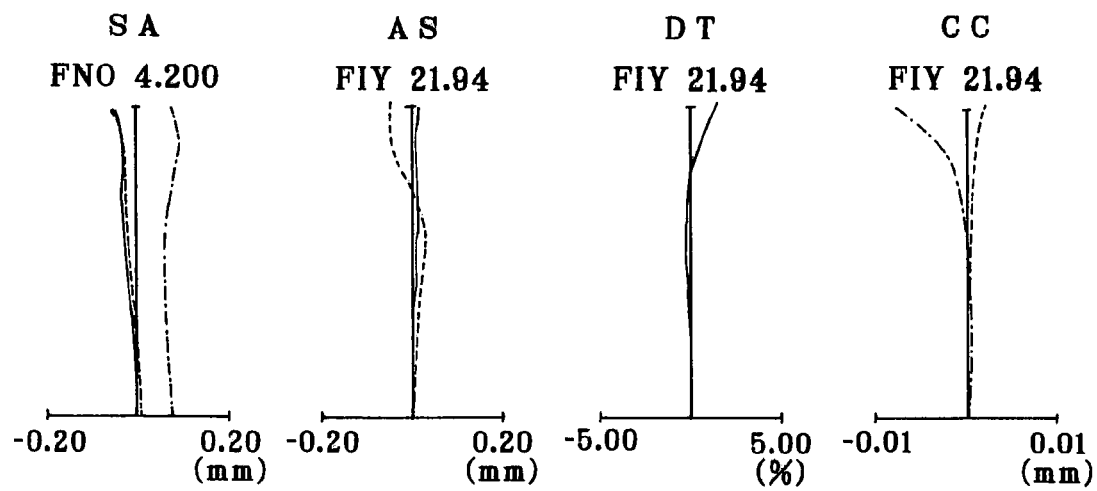
Figure 10C:
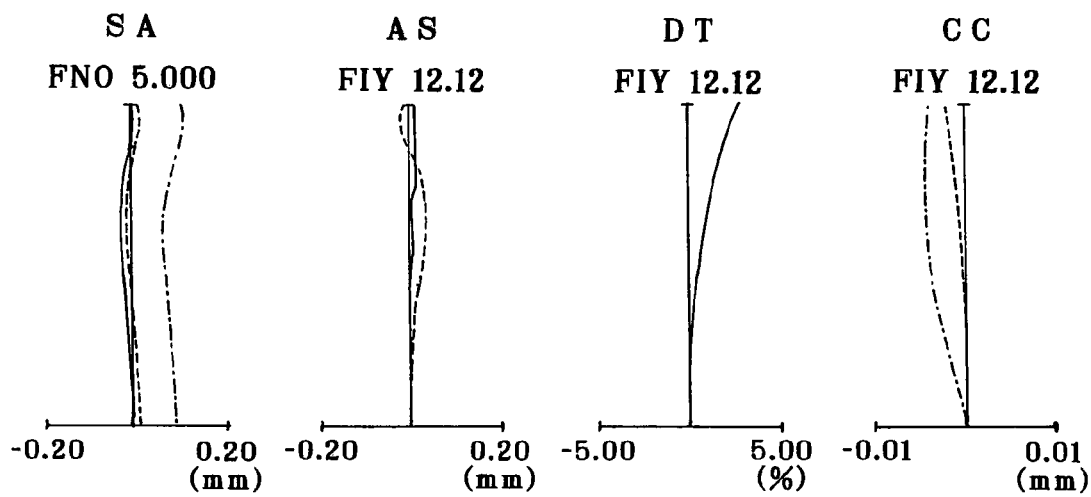

As shown in FIG. 5, this example is directed to a zoom lens made up of, in order from its object side, the first lens group G1 that has positive power and remains fixed during zooming, the second lens group G2 that has negative power and moves toward the image side from the wide-angle end to the telephoto end in such a way as to be positioned on the image side at the telephoto end rather than at the wide-angle end upon zooming, the third lens group G3 that has positive power and remains fixed during zooming, the aperture stop S that remains fixed during zooming, the fourth lens group G4 that has positive power and moves toward the object side from the wide-angle end to the telephoto end in such a way as to be positioned on the object side at the telephoto end rather than at the wide-angle end upon zooming, and the fifth lens group G5 that has negative power and remains fixed during zooming. A prism P located in the first lens group G1 works bending (flexing) an optical path.

In order from the object side of the zoom lens, the first lens group G1 is made up of a cemented lens of two negative meniscus lenses, each convex on its object side, the prism P and a double-convex positive lens; the second lens group G2 is made up of a negative meniscus lens convex on its object side and a cemented lens consisting of a double-concave negative lens and a double-convex positive lens; the third lens group G3 is made up of one double-convex positive lens; the fourth lens group G4 is made up of a cemented lens consisting of a double-convex positive lens and a negative meniscus lens concave on its object side; and the fifth lens group G5 is made of a cemented lens consisting of a double-concave negative lens and a positive meniscus lens convex on its object side and a positive meniscus lens convex on its object side.

Six aspheric surfaces are used: one at the cementing surface of the cemented lens in the first lens group G1, two at both surfaces of the double-convex positive lens in the first lens group G1, two at both surfaces of the double-convex positive lens in the third lens group G3, and one at the surface nearest to the object side of the cemented lens in the fourth lens group G4.

Numerical data about each of Examples 1, 2, 3, 4 and 5 are enumerated below. The symbols used hereinafter but not hereinbefore have the following meanings.

f: focal length of the zoom lens system,
$F_{NO}$: F-number,
$2\omega$: full angle of view,
WE: wide-angle end,
ST: intermediate state,
TE: telephoto end,
$r_1, r_2 \ldots$ : radius of curvature of each lens surface,
$d_1, d_2 \ldots$ : space between adjacent lens surfaces,
$n_{d1}, n_{d2} \ldots$ : d-line refractive index of each lens, and
$V_{d1}, V_{d2} \ldots$ : Abbe constant of each lens.

Here let x be an optical axis provided that the direction of travel of light is positive and y be a direction orthogonal to the optical axis. Then, aspheric shape is given by $$x=(y^2/r)/[1+\{1-(K+1)(y/r)^2\}^{1/2}]+A_4y^4+A_6y^6+A_8y^8+A_{10}y^{10}$$

where r is a paraxial radius of curvature, K is a conical coefficient, and $A_4$, $A_6$, $A_8$ and $A_{10}$ are the $4^{th}$-, $6^{th}$-, $8^{th}$-, and $10^{th}$-order aspheric coefficients, respectively.

Example 1

| | | | |
|---|---|---|---|
| $r_1 = 79.245$ | $d_1 = 0.80$ | $n_{d1} = 2.00069$ | $v_{d1} = 25.46$ |
| $r_2 = 10.737$ | $d_2 = 1.85$ | | |
| $r_3 = \infty$ | $d_3 = 8.40$ | $n_{d2} = 2.00330$ | $v_{d2} = 28.27$ |
| $r_4 = \infty$ | $d_4 = 0.30$ | | |

-continued

| | | | |
|---|---|---|---|
| $r_5 = 15.402$ (Aspheric) | $d_5 = 2.67$ | $n_{d3} = 1.76802$ | $\nu_{d3} = 49.24$ |
| $r_6 = -22.552$ (Aspheric) | $d_6 =$ (Variable) | | |
| $r_7 = 40.183$ | $d_7 = 0.50$ | $n_{d4} = 1.88300$ | $\nu_{d4} = 40.76$ |
| $r_8 = 7.191$ | $d_8 = 1.07$ | | |
| $r_9 = -14.386$ | $d_9 = 0.45$ | $n_{d5} = 1.88300$ | $\nu_{d5} = 40.76$ |
| $r_{10} = 8.265$ | $d_{10} = 1.15$ | $n_{d6} = 1.92286$ | $\nu_{d6} = 20.88$ |
| $r_{11} = -8422.538$ | $d_{11} =$ (Variable) | | |
| $r_{12} = 9.608$ (Aspheric) | $d_{12} = 1.54$ | $n_{d7} = 1.62299$ | $\nu_{d7} = 58.12$ |
| $r_{13} = -38.385$ (Aspheric) | $d_{13} = 1.00$ | | |
| $r_{14} = \infty$ (Stop) | $d_{14} =$ (Variable) | | |
| $r_{15} = 8.672$ (Aspheric) | $d_{15} = 2.61$ | $n_{d8} = 1.62299$ | $\nu_{d8} = 58.12$ |
| $r_{16} = -6.739$ | $d_{16} = 0.54$ | $n_{d9} = 1.92286$ | $\nu_{d9} = 20.88$ |
| $r_{17} = -11.899$ | $d_{17} =$ (Variable) | | |
| $r_{18} = -44.226$ | $d_{18} = 0.50$ | $n_{d10} = 2.00330$ | $\nu_{d10} = 28.27$ |
| $r_{19} = 4.235$ | $d_{19} = 2.37$ | $n_{d11} = 1.51633$ | $\nu_{d11} = 64.14$ |
| $r_{20} = 9.498$ | $d_{20} = 0.94$ | | |
| $r_{21} = 10.761$ | $d_{21} = 1.80$ | $n_{d12} = 1.84666$ | $\nu_{d12} = 23.78$ |
| $r_{22} = -602.041$ | $d_{22} = 3.88$ | | |
| $r_{23} = \infty$ | $d_{23} = 0.50$ | $n_{d13} = 1.51680$ | $\nu_{d13} = 64.20$ |
| $r_{24} = \infty$ | $d_{24} = 0.50$ | | |
| $r_{25} = \infty$ | $d_{25} = 0.50$ | $n_{d14} = 1.51680$ | $\nu_{d14} = 64.20$ |
| $r_{26} = \infty$ | $d_{26} = 0.37$ | | |
| $r_{27} = \infty$ (Imaging plane) | | | |

Aspherical Coefficients

5th surface $K = 0.000$
$A_4 = -8.79913 \times 10^{-5}$
$A_6 = 4.89886 \times 10^{-7}$
$A_8 = -3.64842 \times 10^{-8}$
$A_{10} = 2.72077 \times 10^{-10}$ 6th surface $K = 0.000$
$A_4 = -3.45410 \times 10^{-5}$
$A_6 = 6.14987 \times 10^{-7}$
$A_8 = -4.14321 \times 10^{-8}$
$A_{10} = 4.54264 \times 10^{-10}$ 12th surface $K = 0.000$
$A_4 = -3.66208 \times 10^{-4}$
$A_6 = -5.90379 \times 10^{-5}$
$A_8 = 9.30717 \times 10^{-6}$
$A_{10} = -5.73359 \times 10^{-7}$ 13th surface $K = 0.000$
$A_4 = -1.89671 \times 10^{-4}$
$A_6 = -5.64567 \times 10^{-5}$
$A_8 = 9.30033 \times 10^{-6}$
$A_{10} = -5.93075 \times 10^{-7}$ 15th surface $K = 0.000$
$A_4 = -3.48870 \times 10^{-4}$
$A_6 = -1.61544 \times 10^{-5}$
$A_8 = 2.48258 \times 10^{-6}$
$A_{10} = -1.23458 \times 10^{-7}$ Zooming Data ($\infty$)

| | WE | ST | TE |
|---|---|---|---|
| f (mm) | 5.07 | 9.40 | 17.40 |
| $F_{NO}$ | 3.60 | 4.30 | 5.10 |
| $2\omega$ (°) | 80.86 | 44.35 | 24.24 |
| $d_6$ | 0.60 | 6.76 | 10.79 |
| $d_{11}$ | 10.69 | 4.54 | 0.50 |
| $d_{14}$ | 6.20 | 4.32 | 2.05 |
| $d_{17}$ | 1.51 | 3.39 | 5.66 |

Example 2

| | | | |
|---|---|---|---|
| $r_1 = -153.902$ | $d_1 = 0.80$ | $n_{d1} = 2.00170$ | $\nu_{d1} = 20.60$ |
| $r_2 = 12.979$ (Aspheric) | $d_2 = 1.91$ | | |
| $r_3 = \infty$ | $d_3 = 8.50$ | $n_{d2} = 1.90366$ | $\nu_{d2} = 31.31$ |
| $r_4 = \infty$ | $d_4 = 0.30$ | | |
| $r_5 = 10.604$ (Aspheric) | $d_5 = 2.58$ | $n_{d3} = 1.80139$ | $\nu_{d3} = 45.45$ |
| $r_6 = -74.045$ (Aspheric) | $d_6 =$ (Variable) | | |
| $r_7 = 180.770$ | $d_7 = 0.50$ | $n_{d4} = 1.88300$ | $\nu_{d4} = 40.76$ |
| $r_8 = 7.336$ | $d_8 = 1.28$ | | |
| $r_9 = -14.370$ | $d_9 = 0.45$ | $n_{d5} = 1.88300$ | $\nu_{d5} = 40.76$ |
| $r_{10} = 8.729$ | $d_{10} = 1.15$ | $n_{d6} = 1.92286$ | $\nu_{d6} = 20.88$ |
| $r_{11} = -62.471$ | $d_{11} =$ (Variable) | | |
| $r_{12} = 8.946$ (Aspheric) | $d_{12} = 1.54$ | $n_{d7} = 1.67790$ | $\nu_{d7} = 55.34$ |
| $r_{13} = -116.820$ (Aspheric) | $d_{13} = 1.00$ | | |
| $r_{14} = \infty$ (Stop) | $d_{14} =$ (Variable) | | |
| $r_{15} = 9.447$ (Aspheric) | $d_{15} = 2.58$ | $n_{d8} = 1.62299$ | $\nu_{d8} = 58.12$ |
| $r_{16} = -6.914$ | $d_{16} = 0.54$ | $n_{d9} = 1.92286$ | $\nu_{d9} = 20.88$ |
| $r_{17} = -12.280$ | $d_{17} =$ (Variable) | | |
| $r_{18} = -20.311$ | $d_{18} = 0.50$ | $n_{d10} = 2.00330$ | $\nu_{d10} = 28.27$ |
| $r_{19} = 5.042$ | $d_{19} = 3.10$ | $n_{d11} = 1.51633$ | $\nu_{d11} = 64.14$ |
| $r_{20} = -23.168$ | $d_{20} = 0.90$ | | |
| $r_{21} = 11.413$ | $d_{21} = 1.80$ | $n_{d12} = 1.84666$ | $\nu_{d12} = 23.78$ |
| $r_{22} = 14.325$ | $d_{22} = 3.32$ | | |
| $r_{23} = \infty$ | $d_{23} = 0.50$ | $n_{d13} = 1.51680$ | $\nu_{d13} = 64.20$ |
| $r_{24} = \infty$ | $d_{24} = 0.50$ | | |
| $r_{25} = \infty$ | $d_{25} = 0.50$ | $n_{d14} = 1.51680$ | $\nu_{d14} = 64.20$ |
| $r_{26} = \infty$ | $d_{26} = 0.37$ | | |
| $r_{27} = \infty$ (Imaging plane) | | | |

Aspherical Coefficients

2nd surface $K = 0.000$
$A_4 = -1.79166 \times 10^{-4}$
$A_6 = -4.73057 \times 10^{-9}$
$A_8 = -2.98332 \times 10^{-9}$
$A_{10} = 0$ 5th surface $K = 0.000$
$A_4 = -1.23552 \times 10^{-4}$
$A_6 = -1.59616 \times 10^{-7}$
$A_8 = -7.97986 \times 10^{-9}$
$A_{10} = -3.77581 \times 10^{-11}$ 6th surface $K = 0.000$
$A_4 = 5.80825 \times 10^{-5}$
$A_6 = 3.64807 \times 10^{-8}$
$A_8 = -1.36016 \times 10^{-8}$
$A_{10} = 1.80629 \times 10^{-10}$ 12th surface $K = 0.000$
$A_4 = -1.30705 \times 10^{-4}$
$A_6 = -1.84239 \times 10^{-5}$
$A_8 = 5.36309 \times 10^{-6}$
$A_{10} = -3.20137 \times 10^{-7}$ 13th surface $K = 0.000$
$A_4 = 8.59092 \times 10^{-5}$
$A_6 = -2.59294 \times 10^{-5}$
$A_8 = 7.40107 \times 10^{-6}$
$A_{10} = -4.60471 \times 10^{-7}$ 15th surface $K = 0.000$
$A_4 = -3.73446 \times 10^{-4}$ -continued $A_6 = 1.40361 \times 10^{-5}$
$A_8 = -2.39746 \times 10^{-6}$
$A_{10} = 1.26173 \times 10^{-7}$ Zooming Data (∞)

|  | WE | ST | TE |
|---|---|---|---|
| f (mm) | 5.07 | 9.40 | 17.40 |
| $F_{NO}$ | 3.50 | 4.20 | 4.90 |
| 2ω (°) | 80.25 | 43.90 | 24.24 |
| $d_6$ | 0.60 | 6.55 | 10.64 |
| $d_{11}$ | 10.55 | 4.60 | 0.50 |
| $d_{14}$ | 5.97 | 4.13 | 2.05 |
| $d_{17}$ | 1.51 | 3.36 | 5.44 |

Example 3

| | | | |
|---|---|---|---|
| $r_1 = 94.193$ | $d_1 = 0.80$ | $n_{d1} = 2.00069$ | $\nu_{d1} = 25.46$ |
| $r_2 = 10.777$ | $d_2 = 1.90$ | | |
| $r_3 = \infty$ | $d_3 = 8.40$ | $n_{d2} = 2.00330$ | $\nu_{d2} = 28.27$ |
| $r_4 = \infty$ | $d_4 = 0.30$ | | |
| $r_5 = 15.253$ (Aspheric) | $d_5 = 2.67$ | $n_{d3} = 1.76802$ | $\nu_{d3} = 49.24$ |
| $r_6 = -22.635$ (Aspheric) | $d_6 = $ (Variable) | | |
| $r_7 = 30.598$ | $d_7 = 0.50$ | $n_{d4} = 1.88300$ | $\nu_{d4} = 40.76$ |
| $r_8 = 7.008$ | $d_8 = 1.08$ | | |
| $r_9 = -14.944$ | $d_9 = 0.45$ | $n_{d5} = 1.88300$ | $\nu_{d5} = 40.76$ |
| $r_{10} = 7.893$ | $d_{10} = 1.12$ | $n_{d6} = 1.92286$ | $\nu_{d6} = 20.88$ |
| $r_{11} = 162.059$ | $d_{11} = $ (Variable) | | |
| $r_{12} = 9.600$ (Aspheric) | $d_{12} = 1.54$ | $n_{d7} = 1.62299$ | $\nu_{d7} = 58.12$ |
| $r_{13} = -37.829$ (Aspheric) | $d_{13} = 1.00$ | | |
| $r_{14} = \infty$ (Stop) | $d_{14} = $ (Variable) | | |
| $r_{15} = 8.474$ (Aspheric) | $d_{15} = 2.66$ | $n_{d8} = 1.62299$ | $\nu_{d8} = 58.12$ |
| $r_{16} = -6.619$ | $d_{16} = 0.54$ | $n_{d9} = 1.92286$ | $\nu_{d9} = 20.88$ |
| $r_{17} = -11.728$ | $d_{17} = $ (Variable) | | |
| $r_{18} = -29.689$ | $d_{18} = 0.50$ | $n_{d10} = 2.00330$ | $\nu_{d10} = 28.27$ |
| $r_{19} = 4.379$ | $d_{19} = 2.19$ | $n_{d11} = 1.51633$ | $\nu_{d11} = 64.14$ |
| $r_{20} = 10.038$ | $d_{20} = 0.97$ | | |
| $r_{21} = 12.327$ | $d_{21} = 1.80$ | $n_{d12} = 1.84666$ | $\nu_{d12} = 23.78$ |
| $r_{22} = -68.566$ | $d_{22} = 4.01$ | | |
| $r_{23} = \infty$ | $d_{23} = 0.50$ | $n_{d13} = 1.51680$ | $\nu_{d13} = 64.20$ |
| $r_{24} = \infty$ | $d_{24} = 0.50$ | | |
| $r_{25} = \infty$ | $d_{25} = 0.50$ | $n_{d14} = 1.51680$ | $\nu_{d14} = 64.20$ |
| $r_{26} = \infty$ | $d_{26} = 0.37$ | | |
| $r_{27} = \infty$ (Imaging plane) | | | |

Aspherical Coefficients

5th surface

K = 0.000
$A_4 = -9.87397 \times 10^{-5}$
$A_6 = 1.15328 \times 10^{-6}$
$A_8 = -5.49135 \times 10^{-8}$
$A_{10} = 6.09563 \times 10^{-10}$ 6th surface K = 0.000
$A_4 = -4.24242 \times 10^{-5}$
$A_6 = 1.40352 \times 10^{-6}$
$A_8 = -6.50420 \times 10^{-8}$
$A_{10} = 8.57412 \times 10^{-10}$ 12th surface K = 0.000
$A_4 = -4.72028 \times 10^{-4}$
$A_6 = -8.04768 \times 10^{-5}$ -continued $A_8 = 1.12791 \times 10^{-5}$
$A_{10} = -7.31468 \times 10^{-7}$ 13th surface K = 0.000
$A_4 = -3.51794 \times 10^{-4}$
$A_6 = -6.56639 \times 10^{-5}$
$A_8 = 9.41874 \times 10^{-6}$
$A_{10} = -6.46097 \times 10^{-7}$ 15th surface K = 0.000
$A_4 = -3.87575 \times 10^{-4}$
$A_6 = -1.62934 \times 10^{-5}$
$A_8 = 2.60691 \times 10^{-6}$
$A_{10} = -1.30886 \times 10^{-7}$ Zooming Data (∞)

|  | WE | ST | TE |
|---|---|---|---|
| f (mm) | 5.07 | 9.40 | 17.40 |
| $F_{NO}$ | 3.60 | 4.30 | 5.10 |
| 2ω (°) | 80.88 | 44.45 | 24.24 |
| $d_6$ | 0.60 | 6.76 | 10.79 |
| $d_{11}$ | 10.69 | 4.53 | 0.50 |
| $d_{14}$ | 6.15 | 4.30 | 2.05 |
| $d_{17}$ | 1.51 | 3.36 | 5.61 |

Example 4

| | | | |
|---|---|---|---|
| $r_1 = 61.265$ | $d_1 = 0.80$ | $n_{d1} = 2.00069$ | $\nu_{d1} = 25.46$ |
| $r_2 = 10.388$ | $d_2 = 1.94$ | | |
| $r_3 = \infty$ | $d_3 = 8.40$ | $n_{d2} = 1.90366$ | $\nu_{d2} = 31.31$ |
| $r_4 = \infty$ | $d_4 = 0.30$ | | |
| $r_5 = 16.191$ (Aspheric) | $d_5 = 2.55$ | $n_{d3} = 1.82080$ | $\nu_{d3} = 42.71$ |
| $r_6 = -23.992$ (Aspheric) | $d_6 = $ (Variable) | | |
| $r_7 = 75.700$ | $d_7 = 0.50$ | $n_{d4} = 1.88300$ | $\nu_{d4} = 40.76$ |
| $r_8 = 7.487$ | $d_8 = 1.13$ | | |
| $r_9 = -18.197$ | $d_9 = 0.45$ | $n_{d5} = 1.88300$ | $\nu_{d5} = 40.76$ |
| $r_{10} = 6.886$ | $d_{10} = 1.22$ | $n_{d6} = 1.92286$ | $\nu_{d6} = 20.88$ |
| $r_{11} = 76.975$ | $d_{11} = $ (Variable) | | |
| $r_{12} = 9.531$ (Aspheric) | $d_{12} = 1.53$ | $n_{d7} = 1.67790$ | $\nu_{d7} = 55.34$ |
| $r_{13} = -55.362$ (Aspheric) | $d_{13} = 1.00$ | | |
| $r_{14} = \infty$ (Stop) | $d_{14} = $ (Variable) | | |
| $r_{15} = 8.917$ (Aspheric) | $d_{15} = 2.75$ | $n_{d8} = 1.62299$ | $\nu_{d8} = 58.12$ |
| $r_{16} = -6.211$ | $d_{16} = 0.54$ | $n_{d9} = 1.92286$ | $\nu_{d9} = 20.88$ |
| $r_{17} = -11.293$ | $d_{17} = $ (Variable) | | |
| $r_{18} = -22.013$ | $d_{18} = 0.50$ | $n_{d10} = 2.00330$ | $\nu_{d10} = 28.27$ |
| $r_{19} = 4.213$ | $d_{19} = 2.98$ | $n_{d11} = 1.64000$ | $\nu_{d11} = 60.08$ |
| $r_{20} = 11.057$ | $d_{20} = 0.90$ | | |
| $r_{21} = 12.761$ | $d_{21} = 1.88$ | $n_{d12} = 1.84666$ | $\nu_{d12} = 23.78$ |
| $r_{22} = -47.501$ | $d_{22} = 3.51$ | | |
| $r_{23} = \infty$ | $d_{23} = 0.50$ | $n_{d13} = 1.51680$ | $\nu_{d13} = 64.20$ |
| $r_{24} = \infty$ | $d_{24} = 0.50$ | | |
| $r_{25} = \infty$ | $d_{25} = 0.50$ | $n_{d14} = 1.51680$ | $\nu_{d14} = 64.20$ |
| $r_{26} = \infty$ | $d_{26} = 0.37$ | | |
| $r_{27} = \infty$ (Imaging plane) | | | |

Aspherical Coefficients

5th surface

K = 0.000
$A_4 = -8.96007 \times 10^{-5}$
$A_6 = 9.20191 \times 10^{-8}$
$A_8 = -9.46895 \times 10^{-9}$
$A_{10} = -3.43126 \times 10^{-10}$ -continued

| 6th surface |
|---|
| K = 0.000 |
| $A_4 = -4.66055 \times 10^{-5}$ |
| $A_6 = 3.45368 \times 10^{-7}$ |
| $A_8 = -2.10437 \times 10^{-8}$ |
| $A_{10} = -4.70110 \times 10^{-11}$ |
| 12th surface |
| K = 0.000 |
| $A_4 = -2.50803 \times 10^{-4}$ |
| $A_6 = -3.40928 \times 10^{-5}$ |
| $A_8 = 6.25715 \times 10^{-6}$ |
| $A_{10} = -4.27674 \times 10^{-7}$ |
| 13th surface |
| K = 0.000 |
| $A_4 = -1.00039 \times 10^{-4}$ |
| $A_6 = -2.55299 \times 10^{-5}$ |
| $A_8 = 5.64606 \times 10^{-6}$ |
| $A_{10} = -4.33993 \times 10^{-7}$ |
| 15th surface |
| K = 0.000 |
| $A_4 = -3.48071 \times 10^{-4}$ |
| $A_6 = -4.87510 \times 10^{-6}$ |
| $A_8 = 1.54082 \times 10^{-6}$ |
| $A_{10} = -9.89010 \times 10^{-8}$ |

Zooming Data (∞)

| | WE | ST | TE |
|---|---|---|---|
| f (mm) | 5.07 | 9.40 | 17.40 |
| $F_{NO}$ | 3.60 | 4.30 | 5.00 |
| 2ω (°) | 80.56 | 44.31 | 24.24 |
| $d_6$ | 0.60 | 6.46 | 10.32 |
| $d_{11}$ | 10.22 | 4.36 | 0.50 |
| $d_{14}$ | 6.32 | 4.36 | 2.05 |
| $d_{17}$ | 1.51 | 3.48 | 5.78 |

Example 5

| | | | |
|---|---|---|---|
| $r_1 = 235.816$ | $d_1 = 0.80$ | $n_{d1} = 2.00069$ | $v_{d1} = 25.46$ |
| $r_2 = 11.909$ (Aspheric) | $d_2 = 0.10$ | $n_{d2} = 1.63494$ | $v_{d2} = 23.22$ |
| $r_3 = 11.778$ | $d_3 = 1.84$ | | |
| $r_4 = \infty$ | $d_4 = 8.40$ | $n_{d3} = 1.90366$ | $v_{d3} = 31.31$ |
| $r_5 = \infty$ | $d_5 = 0.30$ | | |
| $r_6 = 13.202$ (Aspheric) | $d_6 = 2.61$ | $n_{d4} = 1.80139$ | $v_{d4} = 45.45$ |
| $r_7 = -31.571$ (Aspheric) | $d_7 = $ (Variable) | | |
| $r_8 = 262.366$ | $d_8 = 0.50$ | $n_{d5} = 1.88300$ | $v_{d5} = 40.76$ |
| $r_9 = 7.420$ | $d_9 = 1.20$ | | |
| $r_{10} = -14.068$ | $d_{10} = 0.45$ | $n_{d6} = 1.88300$ | $v_{d6} = 40.76$ |
| $r_{11} = 8.001$ | $d_{11} = 1.25$ | $n_{d7} = 1.92286$ | $v_{d7} = 20.88$ |
| $r_{12} = -83.756$ | $d_{12} = $ (Variable) | | |
| $r_{13} = 9.090$ (Aspheric) | $d_{13} = 1.55$ | $n_{d8} = 1.67790$ | $v_{d8} = 55.34$ |
| $r_{14} = -82.610$ (Aspheric) | $d_{14} = 1.00$ | | |
| $r_{15} = \infty$ (Stop) | $d_{15} = $ (Variable) | | |
| $r_{16} = 9.328$ (Aspheric) | $d_{16} = 2.65$ | $n_{d9} = 1.62299$ | $v_{d9} = 58.12$ |
| $r_{17} = -6.373$ | $d_{17} = 0.54$ | $n_{d10} = 1.92286$ | $v_{d10} = 20.88$ |
| $r_{18} = -11.361$ | $d_{18} = $ (Variable) | | |
| $r_{19} = -26.951$ | $d_{19} = 0.50$ | $n_{d11} = 2.00330$ | $v_{d11} = 28.27$ |
| $r_{20} = 4.534$ | $d_{20} = 3.37$ | $n_{d12} = 1.51633$ | $v_{d12} = 64.14$ |
| $r_{21} = 237.231$ | $d_{21} = 0.93$ | | |
| $r_{22} = 12.843$ | $d_{22} = 1.79$ | $n_{d13} = 1.84666$ | $v_{d13} = 23.78$ |
| $r_{23} = 31.743$ | $d_{23} = 3.19$ | | |
| $r_{24} = \infty$ | $d_{24} = 0.50$ | $n_{d14} = 1.51680$ | $v_{d14} = 64.20$ |
| $r_{25} = \infty$ | $d_{25} = 0.50$ | | |
| $r_{26} = \infty$ | $d_{26} = 0.50$ | $n_{d15} = 1.51680$ | $v_{d15} = 64.20$ |
| $r_{27} = \infty$ | $d_{27} = 0.37$ | | |
| $r_{28} = \infty$ (Imaging plane) | | | |

-continued

| Aspherical Coefficients |
|---|
| 2nd surface |
| K = 0.000 |
| $A_4 = -1.23512 \times 10^{-4}$ |
| $A_6 = -4.41841 \times 10^{-6}$ |
| $A_8 = 3.03797 \times 10^{-8}$ |
| $A_{10} = 0$ |
| 6th surface |
| K = 0.000 |
| $A_4 = -1.72818 \times 10^{-5}$ |
| $A_6 = -2.60801 \times 10^{-6}$ |
| $A_8 = 5.02193 \times 10^{-8}$ |
| $A_{10} = -9.33953 \times 10^{-10}$ |
| 7th surface |
| K = 0.000 |
| $A_4 = 7.80624 \times 10^{-5}$ |
| $A_6 = -2.76628 \times 10^{-6}$ |
| $A_8 = 5.81944 \times 10^{-8}$ |
| $A_{10} = -9.20345 \times 10^{-10}$ |
| 13th surface |
| K = 0.000 |
| $A_4 = -9.93670 \times 10^{-5}$ |
| $A_6 = -7.03744 \times 10^{-5}$ |
| $A_8 = 1.45518 \times 10^{-5}$ |
| $A_{10} = -8.56945 \times 10^{-7}$ |
| 14th surface |
| K = 0.000 |
| $A_4 = 1.29919 \times 10^{-4}$ |
| $A_6 = -8.37340 \times 10^{-5}$ |
| $A_8 = 1.79486 \times 10^{-5}$ |
| $A_{10} = -1.09991 \times 10^{-6}$ |
| 16th surface |
| K = 0.000 |
| $A_4 = -3.02414 \times 10^{-4}$ |
| $A_6 = -2.41845 \times 10^{-5}$ |
| $A_8 = 3.70554 \times 10^{-6}$ |
| $A_{10} = -1.83040 \times 10^{-7}$ |

Zooming Data (∞)

| | WE | ST | TE |
|---|---|---|---|
| f (mm) | 5.07 | 9.40 | 17.40 |
| $F_{NO}$ | 3.60 | 4.20 | 5.00 |
| 2ω (°) | 80.07 | 43.89 | 24.24 |
| $d_7$ | 0.60 | 6.48 | 10.46 |
| $d_{12}$ | 10.36 | 4.48 | 0.50 |
| $d_{15}$ | 6.08 | 4.20 | 2.05 |
| $d_{18}$ | 1.51 | 3.39 | 5.55 |

FIGS. 6, 7, 8, 9 and 10 are aberration diagrams indicative of spherical aberration (SA), astigmatism (AS), distortion (DT) and chromatic aberration of magnification (CC) at the wide-angle ends (a), in intermediate states (b) and at the telephoto ends (c) of Examples 1, 2, 3, 4 and 5, respectively, upon focusing on an infinite object point.

The values of conditions (1) to (4) in Examples 1, 2, 3, 4 and 5 are given below.

| | Condition | | | |
|---|---|---|---|---|
| | (1) | (2) | (3) | (4) |
| Ex. 1 | 2.08 | 1.21 | 4.18 | 2.44 |
| Ex. 2 | 2.03 | 1.22 | 3.9 | 2.35 |
| Ex. 3 | 2.14 | 1.22 | 4.25 | 2.41 |

-continued

| | Condition | | | |
|---|---|---|---|---|
| | (1) | (2) | (3) | (4) |
| Ex. 4 | 2.39 | 1.17 | 3.96 | 2.48 |
| Ex. 5 | 2.14 | 1.18 | 3.9 | 2.47 |

The zoom lens of the invention may have applications to imaging systems in which an object image formed through the image-formation optical system of the zoom lens is received at a CCD or silver-halide film for taking purposes, specifically a digital camera or digital terminal equipment such as a personal computer, a cellular phone or personal digital assistant (PDA), each having a camera incorporated in it, as embodied below.

Figure 11:
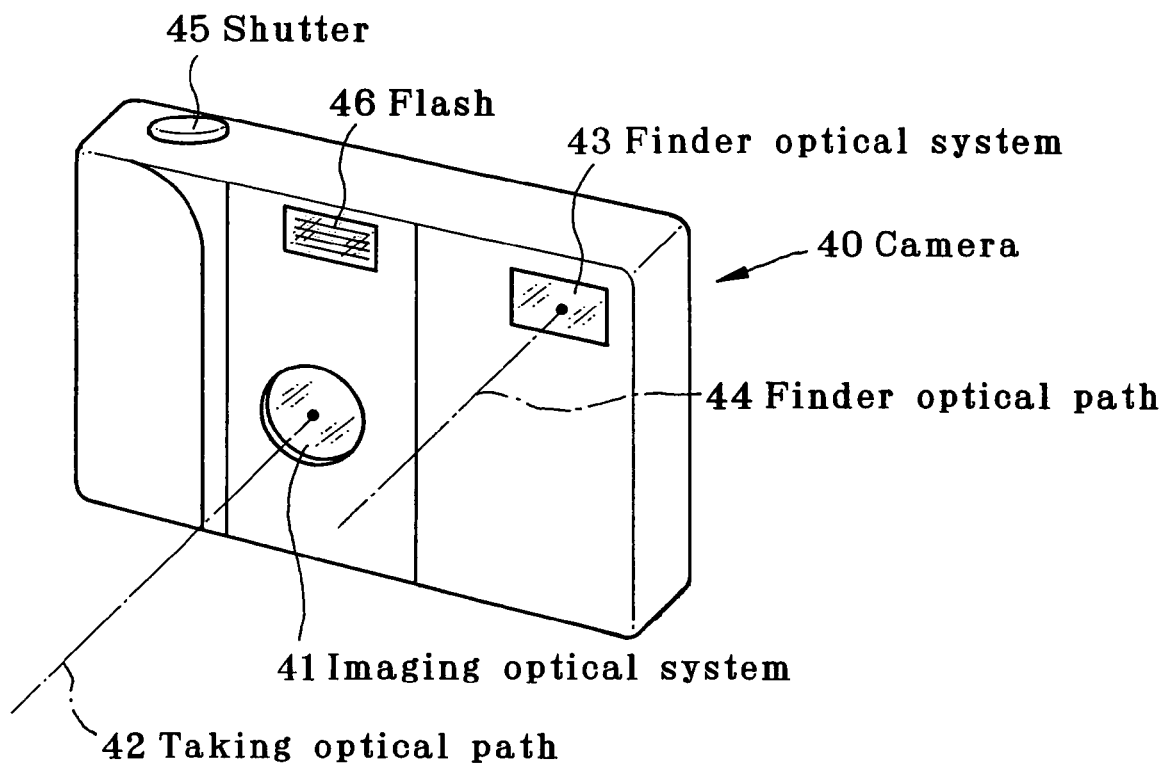
FIG. 11 is a front perspective schematic illustrative of the appearance of a digital camera with the inventive zoom lens built therein.
Figure 12:
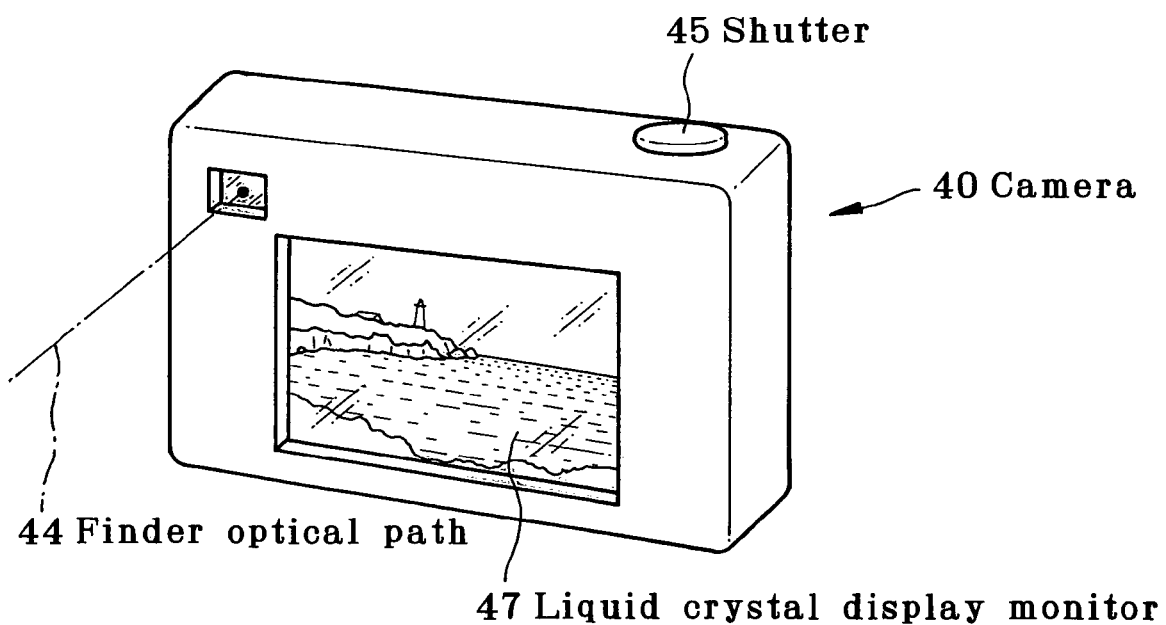
FIG. 12 is a rear perspective schematic of the digital camera of FIG. 11.
Figure 13:
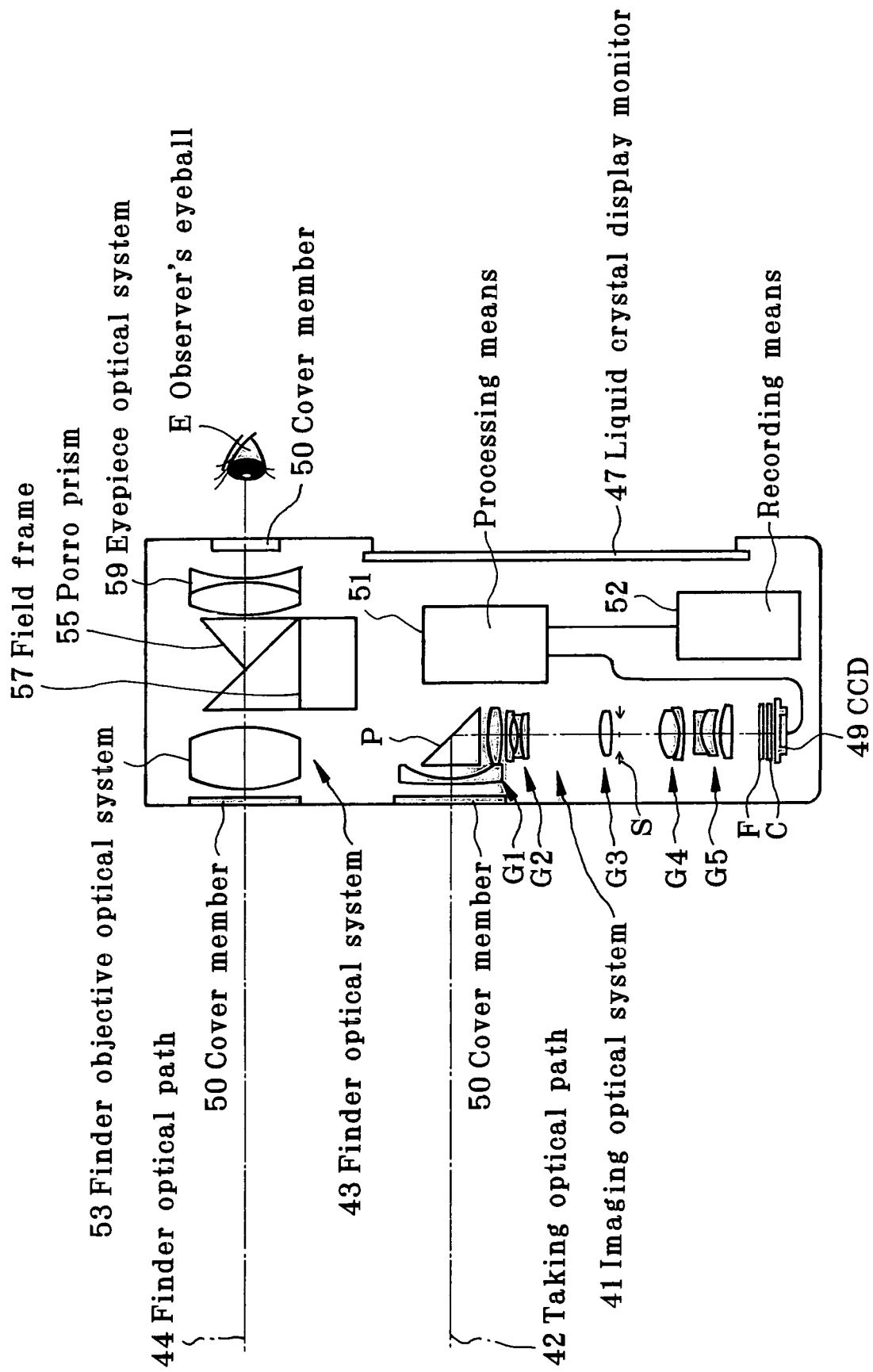
FIG. 13 is a sectional schematic of the digital camera of FIG. 11.

FIGS. 11, 12 and 13 are conceptual illustrations of a taking optical system 41 for digital cameras, in which the zoom les of the invention is incorporated. FIG. 11 is a front perspective view of the appearance of a digital camera 40, and FIG. 12 is a rear perspective view of the same. FIG. 13 is a sectional view of the construction of the digital camera 40. In this embodiment, the digital camera 40 comprises a taking optical system 41 including a taking optical path 42, a finder optical system 43 including a finder optical path 44, a shutter 45, a flash 46, a liquid crystal monitor 47 and so on. As the shutter 45 mounted on the upper portion of the camera 40 is pressed down, it causes an image to be taken through the taking optical system 41, for instance, the o zoom lens of Example 1. An object image formed by the taking optical system 41 is formed on the imaging plane of an imaging device 49 such as CCD or CMOS via a near infrared cut filter and an optical low-pass filter F. An object image received at the imaging device 49 such as CCD or CMOS is shown as an electronic image on the liquid crystal monitor (LCD) 47 via processing means 51, which monitor is mounted on the back of the camera. This processing means 51 is connected with recording means (for instance, a memory) 52 in which the taken electronic image may be recorded. It is here noted that the recording means 52 may be provided separately from the processing means 51 or, alternatively, it may be constructed in such a way that images are electronically recorded and written therein by means of floppy discs, memory cards, MOs or the like. This camera could also be constructed in the form of a silver-halide camera using a silver-halide film in place of CCD 49.

Moreover, a finder objective optical system 53 is located on the finder optical path 44. An object image formed by the finder objective optical system 53 is in turn formed on the field frame 57 of a Porro prism 55 that is an image-erecting member. In the rear of the Porro prism 55 there is an eyepiece optical system 59 located for guiding an erected image into the eyeball E of an observer. It is here noted that cover members 50 are provided on the entrance sides of the taking optical system 41 and finder objective optical system 53 as well as on the exit side of the eyepiece optical system 59.

Figure 14:
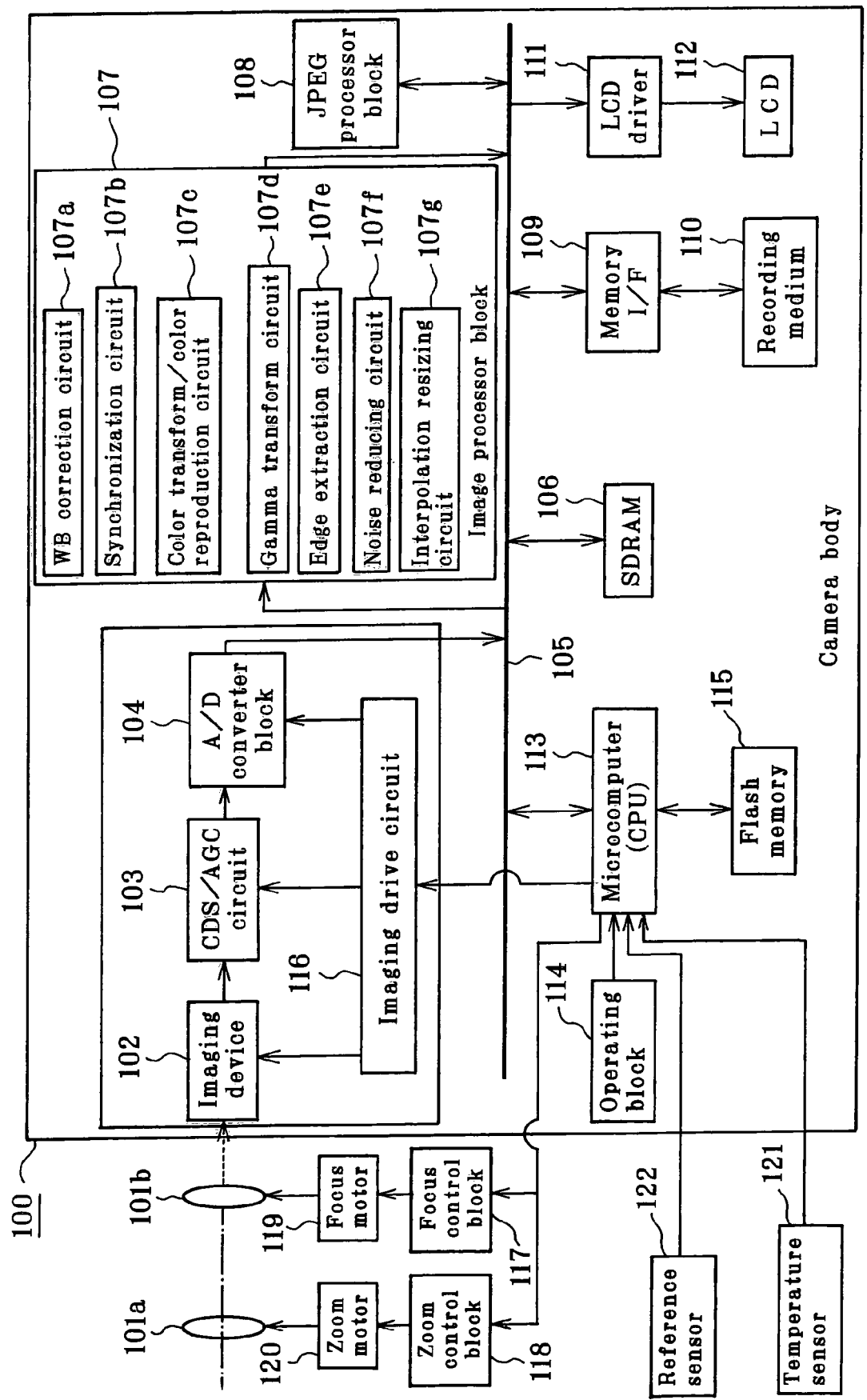
FIG. 14 is a block diagram of internal circuits in the main part of the digital camera.

FIG. 14 is a block diagram for the internal circuits of the main part of the aforesaid digital camera 40. Reference is now made to FIG. 14. There is an imaging device 102 provided, in which color filters in a Bayer array are arranged on the front surface of photodiodes that define pixels. An imaging drive circuit 116 is activated in response to an order from a microcomputer (CPU) 113. The imaging drive circuit 116 is built up of a CDS/AFC circuit comprising a CDS (correlated double sampling) for reducing a noise component and an AGC (automatic gain control) for stabilizing a signal level, and an A/D converter block for converting analog electric signals into digital electric signals.

At the imaging device 102, an object image formed via a zoom lens 101a and a focus lens 101b that form together a taking optical system is received at a photo-diode defined by each pixel. In the zoom lenses of Examples 1 to 5, it is noted that the fifth lens group G5 of each zoom lens constitutes the focus lens 101b; however, other lens group may just as well be used as the focus lens 101b. Then, photoelectric conversion is applied to the object image to produce the quantity of light to the CDS/AGC circuit 103 as the quantity of charges. The Bayer array here is a pixel array wherein lines each having R pixels and G (Gr) pixels alternately in the horizontal direction and lines each having G (Gr) pixels and B pixels alternately in the horizontal direction are lined up alternately in the vertical direction. It is noted that the imaging device 102 may operate in either a CMOS mode or a CCD mode. Although not illustrated, the imaging drive circuit 116 including a timing generator for driving the imaging device, CDS/AGC circuit 103 and A/D converter block 104 are each constructed of an AFE (analog front end circuit) IC device.

Suppose here that the imaging device 102 can be driven in multiple modes at least involving a pixel addition read mode and a full pixel addition read mode. The pixel addition read mode is a drive mode adapted to read a plurality of adjacent pixels after the addition of their charges, while the full pixel addition read mode is a drive mode adapted to read all charges out of the effective pixels of the imaging device.

The CDS (correlated double sampling)/AGC (auto gain control) circuit 103 applies waveform shaping to electric signals (analog image signals) read out of the imaging device 102 after reducing noises, etc., and further achieves high gain in such a way that the brightness of the image becomes the desired one. The A/D converter block 104 is adapted to convert the analog image signals pre-processed at the CDS/AGC circuit 103 into digital image signals (hereinafter called the image data).

A bus 105 is a transfer path for transferring various data produced within the camera to the respective parts of the camera, and is connected to the A/D converter block 104, SDRAM 106, an image processor block 107, a JPEG processor block 108, a memory I/F 109, an LCD driver 111 and a CPU 113. The image data garnered at A/D converter block 104 is once stored in the SDRAM 104 via the bus 105. The SDRAM 106 is adapted to temporarily store various data such as image data obtained at the A/D converter block 104, and image data processed at the image processor block 107 and JPEG processor block 108.

At the image processor block 107, the image data stored in the SDRAM 106 are read out to apply image processing to them. This image processor block 107 is constructed of a WB correction circuit 107a, a synchronization circuit 107b, a color transform/color reproduction circuit 107c, a gamma transform circuit 107d, an edge extraction circuit 107e, a noise reduction circuit 107f and an interpolation resizing circuit 107h.

The white balance (WB) correction circuit 107a multiplies R data and B data of the image data read out of the SDRAM 106 by white balance gain ordered from the CPU 113 to implement white balance correction. The synchronization circuit 107b generates from the image data produced out of the WB correction circuit 107a image data wherein three colors R, G and B constitute one pixel component. The color transform/color reproduction circuit 107c implements linear transform to multiply the image data produced out of the synchronization circuit 107b by a color matrix ordered from the CPU 113, thereby correcting the image data for colors, and changing the tint of the image by calculation using a color saturation-hue coefficient. The gamma transform circuit 107d applies gamma transform (tone transform) processing to the image data produced out of the color transform/color reproduction circuit 107c so that the tone of the image data is corrected in such a way as to fit for displaying or printing.

The edge extraction circuit 107e extracts the edge component of the image data using a BPF (band-pass filter) coefficient ordered from the CPU 113. The noise reducing circuit 107f working as a block for extracting information about a flat portion and reducing noises applies filtering to the image data using a filter parameter ordered from the CPU 113, thereby reducing noises in the image data. The interpolation resizing circuit 107g implements resizing for image data interpolation processing and for adjustment of output size as well.

At such image processor block 107 as described above, the image data already subjected to image processing are again stored in the SDRAM 106.

The JPEG processor block 108 reads out of the SDRAM 106 the image data to which image processing has been applied to implement compression in the JPEG or other mode. The JPEG processor block 108 has also another function of reading the JPEG compressed image data to be recorded in the recording medium 110 and apply extension processing to them. The image data compressed at the JPEG processor block 108 are stored in the SDRAM 106, and then recorded in the recording medium 110 via the memory I/F 109. Not exclusively, the recording medium 110 comprises a memory card detachably attached to the camera body.

The LDC driver 111 is to display an image on the LCD 112. When the JPEG compressed image data recorded in the recording medium 110 are displayed, the JPEG compressed image data recorded in the recording medium 110 are read at the JPEG processor block 108, and extension processing is then applied to them, after which they are once stored in the SDRAM 106. The LCD driver 111 reads such image data out of the SDRAM 106 and converts them into image signals, which are then displayed on the LCD 112.

The CPU 113 working as a co-taking block and a noise reduction assessment block has centralized control over various sequences in the camera body. The CPU 113 is connected with an operating block 114 and a flash memory 115 having a camera program and focus lens position data loaded in it. The operating block 114 comprises a power button, a release button, various enter keys, etc. As the operating block 114 is operated by the user, it allows the CPU 113 to implement various sequences depending on the operation of the operating block 114. The flash memory 115 is to store white balance gain, color matrix, and various parameters such as filter parameters. The CPU 113 reads from the flash memory 115 the parameters necessary for various sequences and issue orders to the respective processing blocks. A reference sensor 14 is to detect whether or not the focus lens 101b lies at a reference position. A temperature sensor 121 is to detect temperature and deliver the result of detection to the CPU 113.

The operating block 114 comprises buttons, switches, etc. for receiving various orders from the operator and delivering them to the CPU 113. Although not illustrated, for instance, it comprises a release button for instructing when to start shooting, a focus mode switch button for selecting an AF (autofocus means) mode/MF (manual focus means):(modes), an MF drive button for selectively moving the focus lens 101b at the time of MF mode selection, a preset button for storing and instructing the position data about the focus lens 101b, a preset value read button for reading and instructing the stored position data about the focus lens 101b, an infinity button for instructing the focus lens 101b to move to a position corresponding to infinity depending on a zoom ratio, etc.

The CPU 113 implements the camera program preloaded in the flash memory 115, thereby controlling the overall operation of this electronic camera. For instance, it implements AF processing (contrast AF processing) or the like on the basis of the contrast of a subject image.

A zoom motor 120 drives the zoom lens 101a via a zoom control block 118 comprising a drive circuit in response to an order from the CPU 113, and a focus motor 119 drives the focus lens 101b via a focus control block 117 comprising a drive circuit in response to an order from the CPU 113. It is here noted that the focus lens 101b is driven by the focus motor 110 in both the AF (autofocus) mode and the MF mode.

The thus constructed digital camera 40 can be reduced in the overall size and thickness because the taking optical system 41 is a high-zoom-ratio, fast yet small-format arrangement with well corrected aberrations.

In the embodiment of FIG. 13, a plane-parallel plate is located as the cover member 50; however, a powered lens may just as well be used.

What I claim is:

1. A zoom lens comprising, in order from its object side, a first lens group having positive power, a second lens group having negative power, a third lens group having positive power, a fourth lens group having positive power and a fifth lens group having negative power, characterized in that:

upon zooming from a wide-angle end to a telephoto end of the zoom lens, said first lens group remains fixed with respect to an image plane, and at least said second lens group and said fourth lens group moves, said first lens group includes a reflecting optical element for bending an optical path and has negative refracting power on an object side with respect to a reflecting surface, said fifth lens group includes at least a cemented lens and a positive lens, and said zoom lens satisfies the following condition (1):

$$1.5 < |f_5/f_w| < 2.7 \ldots \quad (1)$$

where $f_5$ is a focal length of the fifth lens group, and $f_w$ is a focal length of the whole zoom lens system at the wide-angle end.

2. The zoom lens according to claim 1, characterized in that said third lens group remains fixed during zooming.

3. The zoom lens according to claim 1 or 2, characterized in that said first lens group comprises, in order from the object side, a negative lens and said reflecting optical element.

4. The zoom lens according to claim 1 or 2, characterized by satisfying the following condition (2):

$$0.8 < |f_2/f_w| < 1.5 \ldots \quad (2)$$

where $f_2$ is a focal length of the second lens group.

5. The zoom lens according to claim 1 or 2, characterized by satisfying the following condition (3):

$$2.0 < f_1/f_w < 5.0 \ldots \quad (3)$$

where $f_1$ is a focal length of the first lens group.

6. The zoom lens according to claim 3, characterized by satisfying the following condition (4):

$$1.0 < |f_{1L1}/f_w| < 3.0 \ldots \quad (4)$$

where $f_{1L1}$ is a focal length of a system of the first lens group on an object side with respect to the reflecting surface therein.

7. The zoom lens according to claim 6, characterized in that the negative lens in said first lens group includes an aspheric surface.

8. An image recording method, wherein an image formed through a zoom lens as recited in claim 1 is received at an imaging device; an image signal produced out of said imaging device is retained, then subjected to gain control and then subjected to A/D conversion; an image signal subjected to said A/D conversion is stored in a memory, after which an image signal read out of said memory is subjected to compression processing; and finally said image signal is recorded in a recording medium.

9. An image display method, wherein an image formed through a zoom lens as recited in claim 1 is received at an imaging device; an image signal produced out of said imaging device is retained, then subjected to gain control and then subjected to A/D conversion; and an image signal subjected to said A/D conversion is stored in a memory, after which the image signal is read out of said memory to display an image on a display.

10. An imaging system comprising a zoom lens comprising, in order from its object side, a first lens group having positive power, a second lens group having negative power, a third lens group having positive power, a fourth lens group having positive power and a fifth lens group having negative power, and an imaging device located on an image side of said zoom lens, characterized in that:
   upon zooming from a wide-angle end to a telephoto end of the zoom lens, said first lens group remains fixed with respect to an image plane, and at least said second lens group and said fourth lens group moves,
   said first lens group includes a reflecting optical element for bending an optical path and has negative refracting power on an object side with respect to a reflecting surface,
   said fifth lens group includes at least a cemented lens and a positive lens, and
   said zoom lens satisfies the following condition (1):

$$1.5 < |f_5/f_w| < 2.7 \ldots \tag{1}$$

where $f_5$ is a focal length of the fifth lens group, and $f_w$ is a focal length of the whole zoom lens system at the wide-angle end.

11. An image recording method, wherein an image formed through an imaging system as recited in claim 10 is received at an imaging device; an image signal produced out of said imaging device is retained, then subjected to gain control and then subjected to A/D conversion; an image signal subjected to said A/D conversion is stored in a memory, after which an image signal read out of said memory is subjected to compression processing; and finally said image signal is recorded in a recording medium.

12. An image display method, wherein an image formed through an imaging system as recited in claim 10 is received at an imaging device; an image signal produced out of said imaging device is retained, then subjected to gain control and then subjected to A/D conversion; and an image signal subjected to said A/D conversion is stored in a memory, after which the image signal is read out of said memory to display an image on a display.

13. The imaging system according to claim 10, wherein said first lens group comprises, in order from the object side, a negative lens and said reflecting optical element.

14. The imaging system according to claim 13, wherein the negative lens in said first lens group includes an aspheric surface.

15. The imaging system according to claim 10, characterized by satisfying the following condition (2):

$$0.8 < |f_2/f_w| < 1.5 \ldots \tag{2}$$

where $f_2$ is a focal length of the second lens group.

16. The imaging system according to claim 10, characterized by satisfying the following condition (3):

$$2.0 < f_1/f_w < 5.0 \ldots \tag{3}$$

where $f_1$ is a focal length of the first lens group.

17. The imaging system according to claim 10, characterized by satisfying the following condition (4):

$$1.0 < |f_{1L1}/f_w| < 3.0 \ldots \tag{4}$$

where $f_{1L1}$ is a focal length of a system of the first lens group on an object side with respect to the reflecting surface therein.

18. The imaging system according to claim 1 or 10, characterized in that a low-pass filter is interposed between said zoom lens and said imaging device.

* * * * *